US 7,276,546 B2

(12) United States Patent
Buchanan et al.

(10) Patent No.: US 7,276,546 B2
(45) Date of Patent: Oct. 2, 2007

(54) CARBOHYDRATE ESTERS AND POLYOL ESTERS AS PLASTICIZERS FOR POLYMERS, COMPOSITIONS AND ARTICLES INCLUDING SUCH PLASTICIZERS AND METHODS OF USING THE SAME

(75) Inventors: Charles M. Buchanan, Kingsport, TN (US); Norma L. Buchanan, Kingsport, TN (US); Kevin J. Edgar, Kingsport, TN (US); Juanelle L. Lambert, Gray, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 11/131,049

(22) Filed: May 17, 2005

(65) Prior Publication Data
US 2005/0228084 A1    Oct. 13, 2005

Related U.S. Application Data

(62) Division of application No. 10/340,012, filed on Jan. 10, 2003, now Pat. No. 6,977,275.

(60) Provisional application No. 60/349,063, filed on Jan. 16, 2002.

(51) Int. Cl.
*C08L 3/02* (2006.01)
*C08L 3/06* (2006.01)
*C08L 3/08* (2006.01)

(52) U.S. Cl. .................. 524/37; 524/38; 524/39; 524/40; 524/41; 524/42; 524/43; 524/50

(58) Field of Classification Search .................. 524/37, 524/38, 39, 40, 41, 42, 43, 50
See application file for complete search history.

(56) References Cited

U.S. PATENT DOCUMENTS

| 1,683,347 | A |   | 9/1928  | Gray et al. |
| 1,698,049 | A |   | 1/1929  | Clarke et al. |
| 1,880,560 | A |   | 10/1932 | Webber et al. |
| 1,880,808 | A |   | 10/1932 | Clarke et al. |
| 1,984,147 | A |   | 12/1934 | Malm |
| 2,129,052 | A |   | 9/1938  | Fordyce |
| 2,687,970 | A |   | 8/1954  | Brander et al. |
| 2,857,378 | A |   | 10/1958 | Hales et al. |
| 3,093,481 | A | * | 6/1963  | Eckey et al. ............ 426/321 |
| 3,518,249 | A |   | 6/1970  | Hiatt et al. |
| 3,617,201 | A |   | 11/1971 | Beral et al. |
| 3,781,381 | A |   | 12/1973 | Koleske et al. |
| 4,195,112 | A |   | 3/1980  | Sheard et al. |
| 4,474,846 | A |   | 10/1984 | Doerer et al. |
| 4,568,581 | A |   | 2/1986  | Peoples, Jr. |
| 4,675,393 | A |   | 6/1987  | Coxon |
| 4,731,122 | A |   | 3/1988  | Cortese et al. |
| 5,205,863 | A |   | 4/1993  | Elion |
| 5,292,783 | A |   | 3/1994  | Buchanan et al. |
| 5,294,703 | A |   | 3/1994  | Hyatt et al. |
| 5,480,922 | A |   | 1/1996  | Mulhaupt et al. |
| 5,502,178 | A |   | 3/1996  | Gupta |
| 5,589,566 | A |   | 12/1996 | White et al. |
| 5,766,752 | A |   | 6/1998  | Cox et al. |
| 5,830,872 | A |   | 11/1998 | Baldwin et al. |
| 5,883,025 | A |   | 3/1999  | Karstens et al. |
| 5,922,451 | A |   | 7/1999  | Cox et al. |
| 6,123,172 | A |   | 9/2000  | Byrd et al. |
| 6,184,272 | B1 |  | 2/2001  | Foelster et al. |
| 6,506,824 | B1 |  | 1/2003  | Bastioli et al. |
| 6,605,302 | B2 | * | 8/2003  | Faour et al. ............. 424/473 |
| 6,977,275 | B2 | * | 12/2005 | Buchanan et al. ........ 524/37 |

FOREIGN PATENT DOCUMENTS

| DE | 1 261 312    | 2/1968  |
| DE | 42 08 946    | 9/1993  |
| DE | 43 08 427    | 9/1994  |
| DE | 295 01 100   | 7/1996  |
| EP | 0 254 376    | 1/1988  |
| EP | 0 540 279    | 5/1993  |
| EP | 0707037      | 4/1996  |
| GB | 1 585 200    | 2/1981  |
| JP | 42008607     | 5/1967  |
| JP | 49-1333 14   | 4/1974  |
| JP | 54071141     | 6/1979  |
| JP | 60-21618     | 1/1994  |
| JP | 06-278785    | 10/1994 |
| JP | 9263603      | 10/1997 |
| JP | 9316092      | 12/1997 |
| JP | 10-237084    | 9/1998  |
| JP | 00- 351871   | 12/2000 |
| JP | 2001-247717  | 9/2001  |
| SU | 534477       | 11/1976 |
| SU | (11) 1420592 | 8/1988  |
| WO | WO96/01832   | 1/1996  |
| WO | WO 00/12616  | 3/2000  |
| WO | WO 01/98404  | 12/2001 |
| WO | WO 02/18400  | 3/2002  |

OTHER PUBLICATIONS

Akoh and Swanson, "Optimized Synthesis of Sucrose Polyesters: Comparison of Physical Properties of Sucrose Polyesters, Raffinose Polyesters and Salad Oils", J. Food Sci. 55:236 (1990).
Ballini et al., "Zeolite HSZ-360 as a New Reusable Catalyst for the Direct Acetylation of Alchols and Phenols Under Solventless Conditions," *Tetra. Lett.* 39:6049-6052 (1998).

(Continued)

*Primary Examiner*—Robert D. Harlan
(74) *Attorney, Agent, or Firm*—Eastman Chemical Company; Bernard Graves

(57) ABSTRACT

The invention relates to methods of making carbohydrate and polyol esters suitable for use as plasticizers for polymer compositions. The invention also relates to plasticized polymer compositions comprising such carbohydrate and polyol esters. The invention also relates to articles prepared from such plasticized polymer compositions. The invention further relates to methods of using these compositions.

14 Claims, 15 Drawing Sheets

OTHER PUBLICATIONS

Chatterjee and Nuhn, "Stereoselective α-glycosidation using $FeCl_3$ as a Lewis acid catalyst," *Chem Commun.* 16:1729-1730 (1998).

Conchie et al., "Methyl and Phenyl Glycosides of the Common Sugars," Carbohydr. Chem. 12:157 (1957).

Connors and Wachowiak, "N-Methylimidazole as a Catalyst in Hydroxy Compounds Esterification," Herba Polonica, 44:33-38 (1998).

Curini et al., "Heterogeneous Catalysis in Acetylation of Alochols and Pheonols Promoted by Zirconium Sulfophenyl Phosphonate," Synthetic Communications, 30:1319-1329 (2000).

Dasgupta et al., "Acetylation of Carbhoydrates Using Ferric Chloride in Acetic Anhydride," Carbohydrate Research 80:346-349 (1980).

Debenham et al., "Two New Orthogonal Amine-Protecting Groups That Can Be Cleaved Under Mild or Neutral Conditions," J. Am. Chem. Soc. 117:3302-3303 (1995).

Don et al., "Rheed Studies of $CuInSe_2$ Epitaxial Films," *Eighteenth IEEE Photovoltaic Specialists Conference—1985*, Riviera Hotel, Las Vegas, Nevada, Oct. 21-25, 1985.

Erwig and Koenigs, "Note on Pentaacetyladextrose," *Berichte d. D. Chem. Gesellschaft* 22:1464-1467.

Grujić and Michel, "Exponential Stability and Trajectory Bounds of Neural Networks under Structural Variations," *IEEE Transactions on Circuits and Systems*, vol. 38, No. 10, Oct. 1991.

Hofmann et al., "Bleaching Activators as Acylating Agents Kinetics of the Acetylation of Piperidine by Some Bleaching Activators," J. Parkt. Chem. 332:176-180 (1990).

Holfe et al., "4-Dialkylaminopyridines as Highly Active Acylation Catalysts," Angrew. Chem. Int. Ed. Engl. 17:569 (1978).

Holla, "Enzymatische Schutzgruppenchemie An Glaucalen," J. Carbohydr. Chem. 9:113 (1990).

Li et al., "Synthesis of Xylitol C5-9 Fatty Acid Esters and Their Applications," Huaxue Shijie (Chemistry World) 36:632-633 (1995).

Ikeda et al., "Lipase-Catalyzed Acylation of Sugars Solubilized in Hydrophobic Solvents by Complexation," Boitechnol. Bioeng. 42:788-791 (1993).

Iqbal et al., "Cobalt(II) Chloride Catalyzed Acylation of Alcohols with Acetic Anhydride: Scope and Mechanism," J. Org. Chem. 57:2001-2007 (1992).

Kartha and Field, "Iodine : A versatile Reagent in Carbohydrate Chemistry IV. Per-O-Acetylation, Regioselective Acylation and Acetolysis," *Tetrahedron*. 53(34):11753-11766 (1997).

Konen et al., "Esterification of Unsaturated Fatty Acids," Oil and Soap 22:57-60 (1945).

Kopf et al., "Structure of 1,2,3,4,5,6-Hexa-O-acetyl-$_D$glucitol (Sorbitol Hexaacetate)," *Acta Cryst.* C47:2425-2428 (1991).

Kopf et al., "The crystal and molecular structures of the hexitol hexa-acetates," *Carbohydr. Res.* 229:17-32 (1992).

Kou and Xu, "Enzymatic Synthesis of Saccharide Fatty Acid Esters," *Ann. N.Y. Acad. Sci.* 864:352-358 (1998).

Kumareswaran et al., "Nafion-H Catalyzed Acetylation of Alcohols," Synlett 11:1652-1654 (2000).

Lay et al., "Regioselective Acylation of Disaccharides by Enzymatic Transesterification," *Carbohydr. Res.* 291:197-204 (1996).

Li and Li, "Montmorillonite clay catalysis. Part 10.[1] K-10 and KSF-catalysed acylation of alcohols, phenols, thiols and amines: scope and limitation," *J. Chem. Soc. Perkin Trans* 1:1913-1917 (1998).

Li et al., "Montmorillonite K-10 and KSF as remarkable acetylation catalysts," *Chem Commun.* 1389-1390 (1997).

Liebermann et al., "Concerning the Formulas of Rhamnetin and Xanthorhamnin," Ber. 11:1618 (1878).

McBrierty et al., "Hydration and plasticization effects in cellulose acetate: Molecular motion and relaxation," *Faraday Discuss.* 103:225-268 (1996).

Obaje et al., "Solvent-Free Interesterification Process for the Synthesis of Acetylated Glucose Fatty Esters," *Sci. Int.* 11(2):165-168 (1999).

Procopiou et al., "A extremely fast and efficient acylation teaction of alcohols with acid anhydrides in the presence of trimethylsilyl trifluotomethanesulfonate as catalyst," *Chem. Commun.* 2625-2626 (1996).

Schmidt and Michel, "Direct O-Glycosyl Trichloroactimidate Formation. Nucleopholicity of the Anomeric Oxygen Atom," *Tetra. Lett.* 25(8):821-824 (1984).

Schmidt, "News Methods for the Synthesis of Glycosides and Oligosaccharides—Are There Alternatives to the Koenigs-Knorr Method?" *Angrew. Chem. Int. Ed. Engl.* 25:212-235 (1986).

Sharma and Chattopadhyay, "Lipase Catalyzed Acetylation of Carbohydrates," Biotechnol. Lett. 15:1145-1146 (1993).

Shuiin'sh et al., "High-Molecular Catalysts in Organic Synthesis," *Chemistry Series* 2:221-228 (1990).

Swain and Brown, "Concerted Displacement Reactions," *Polyfunctional Catalysis* 74:2538-2543 (May 20, 1952).

Takada et al., "discotic,Columnar Liquid Crystals in Oligosaccharide Derivatives III. Anomeric Effects on the Thermo-Mesomorphic Properties of Cellobiose Octa-Alkanoates," *Liq. Cryst.* 19:411-448 (1995).

Tsuzuki et al., "Synthesis of Sugar Fatty Acid Esters by Modified Lipase," Biotechnol. Bioeng. 64:267-271 (1999).

Vedejs and Diver, "Tributylphosphine: A Remarkable Acylation Catalyst," *J. Am. Chem. Soc.* 115:3358-3359 (1993).

Wang and Tao, Characterization of Plasticized and Mixed Long-Chain Fatty Cellulose Esters, *ACS Symp. Sor.* Chap. 6 723:77-87 (1999).

Warth et al., "Thermoplastic Cellulose Acetate and Cellulose Acetate Compounds Prepared by Reactive Processing," J. Appl. Polym. Sci. 64:231-242 (1997).

Weber and Khorana, "CIV. Total Synthesis of the Structural Gene for an Alanine Transfer Ribonucleic Acid from Yeast. Chemical Synthesis of an Icosadeoxynucleotide Corresponding to the Nucleotide Sequence of 21 to 40," J. Mol. Biol. 72:219 (1972).

Wolfrom and Thompson, Meth. Carbohydr. Chem. 2:211 (1963).

Zitsmanis et al., "High-Molecular Catalysts in Organic Synthesis: XIV. Dialkylaminopyridines on Polymer Matrix," *Chemistry Series* 6:735-741 (1986).

\* cited by examiner

CARBOHYDRATE ESTERS AND POLYOL ESTERS AS PLASTICIZERS FOR POLYMERS, COMPOSITIONS AND ARTICLES INCLUDING SUCH PLASTICIZERS AND METHODS OF USING THE SAME

CROSS-REFERENCE TO RELATED APPLICATIONS

This application is a divisional application of, and claims the benefit of, U.S. application Ser. No. 10/340,012, filed Jan. 10, 2003, now U.S. Pat. No. 6,977,275. U.S. application Ser. No. 10/340,012, claims priority to U.S. Provisional Application No. 60/349,063, filed Jan. 16, 2002. Application Ser. Nos. 10/340,012 and 60/349,063 are incorporated herein in their entireties by this reference.

FIELD OF THE INVENTION

The invention relates to methods of making carbohydrate and polyol esters suitable for use as plasticizers for polymer compositions. The invention also relates to plasticized polymer compositions comprising such carbohydrate and polyol esters. The invention also relates to articles prepared from such plasticized polymer compositions. The invention further relates to methods of using these compositions.

BACKGROUND OF THE INVENTION

Cellulose esters are known to be excellent thermoplastic materials and, accordingly, cellulose esters are utilized in a broad range of applications. The most widely used cellulose esters having good thermoplastic properties are generally cellulose acetate (CA), cellulose acetate propionate (CAP) and cellulose acetate butyrate (CAB). However, other types of cellulose esters can be useful for certain applications. Each of these materials has relatively high melting temperatures (i.e., 150 to 250° C.) and relatively high melt viscosities. Because of this combination of high melting temperature and high melt viscosities, the temperatures needed to melt process these cellulose esters may, in some cases, approach or exceed the decomposition temperature of the cellulose ester. As a result, cellulose esters can degrade during processing which can minimize their usefulness in certain applications.

In order to lower the melt processing temperature, low molecular weight plasticizers may be added prior to or during the melt processing of the cellulose esters. However, such low molecular weight plasticizers may result in certain difficulties. In particular, these plasticizers may often be volatile, have a high water solubility and may not be sufficiently compatible with the cellulose ester.

With regard to plasticizer volatility, in some cases, additional plasticizer must be supplied during compounding and the volatilized plasticizer must be trapped to minimize exposure of personnel to the plasticizer material. In many cases, the plasticizer can migrate to the surface of the finished object where it can plate out, vaporize or otherwise adversely affect the surface properties of a finished article. For example, loss of volatile plasticizer from a finished part can lead to shrinkage, crazing and deterioration of physical properties in a finished cellulose ester article.

Plasticizers can result in additional difficulties as well. For example, cellulose esters are known to have good UV stability. However, many plasticizers that are commonly incorporated into cellulose esters can impart poor UV stability, which can limit the utility of the cellulose ester for certain applications. Additionally, a cellulose ester may not be useful in certain applications if the plasticizer has an affinity for water.

Examples of known plasticizers for cellulose esters include phthalates (e.g. diethyl or dibutyl phthalate), glycerol, triacetin, citrate esters (e.g. triethylcitrate), aliphatic diesters (e.g. dioctyl-adipate), phosphates (e.g. triphenyl phosphate), low molecular weight polyethylene glycols and esters of polyethylene glycols. Selection of such prior art plasticizers and the amount of plasticizer is generally based on the compatibility of the plasticizer with the cellulose ester and on the desired properties in the finished article.

In this regard, it should be noted that the compatibility of each plasticizer will generally vary with the particular cellulose ester. For example, dioctyl adipate generally exhibits poor compatibility with cellulose acetates, but good compatibility with most cellulose acetate butyrates.

Moreover, even within a single type of cellulose ester, the compatibility of the plasticizer can change with the degree of substitution ("DS," i.e., the number of substitutents per anhydroglucose unit). For example, diethyl phthalate ("DEP") may be used as a plasticizer for cellulose acetate with a DS of 2.5 or below; however, DEP is considered to be a poor plasticizer for cellulose acetate with a DS of from 2.8 to 3.0.

Additionally, as would be appreciated by one of ordinary skill in the art, the prior art plasticizers discussed above may be used to plasticize other polymer compositions, such as polylactic acid and polyvinyl chloride. The difficulties noted above with the use of the prior art plasticizers are also generally present with these polymers.

In accordance with the aforementioned difficulties observed with prior art plasticizers for cellulose esters and other polymers, it would be desirable to develop new plasticizers for cellulose esters that have low volatility, good compatibility and other beneficial properties. It would also be desirable to form polymer compositions from such plasticizers. Still further, it would be desirable to form articles from these polymer compositions.

SUMMARY OF THE INVENTION

In one aspect, the invention relates to novel plasticizers for cellulose esters, polylactic acid and polyvinyl chloride. In a further aspect, the invention relates to blends comprising cellulose esters and carbohydrate esters. Still further, the invention relates to blends comprising cellulose esters and polyol esters. Yet still further, the invention provides blends of cellulose esters and carbohydrate esters and polyol esters. The invention also relates to blends comprising polylactic acid and carbohydrate esters. Still further, the invention relates to blends comprising polylactic acid and polyol esters. Yet still further, the invention provides blends of polylactic acid and carbohydrate esters and polyol esters. The invention also relates to blends comprising polyvinyl chloride and carbohydrate esters or polyol esters. Still further, the invention relates to blends comprising polyvinyl chloride and polyol esters. Yet still further, the invention provides blends of polyvinyl chloride and carbohydrate esters and polyol esters.

In a further aspect, the invention relates to articles prepared from polymers plasticized from the novel plasticizers herein. Still further, the invention relates to various methods of making the novel plasticizer materials herein. Yet still further, the present invention relates to methods of using the plasticizer compositions herein.

Additional advantages of the invention will be set forth in part in the detailed description which follows and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory aspects of the invention and are not restrictive of the invention, as claimed.

DETAILED DESCRIPTION OF THE INVENTION

The present invention may be understood more readily by reference to the following detailed description of the invention and the examples provided therein. It is to be understood that this invention is not limited to the specific methods, formulations and conditions described herein which, of course, may vary. It is also to be understood that the terminology used herein is for the purpose of describing particular aspects only and is not intended to be limiting.

In this specification and in the claims that follow, reference will be made to a number of terms, which shall be defined to have the following meanings.

The singular forms "a," "an," and "the" include plural referents unless the context clearly dictates otherwise.

Ranges may be expressed herein as from "about" one particular value and/or to "about" or another particular value. When such a range is expressed, another aspect includes from the one particular value and/or to the other particular value. Similarly, when values are expressed as approximations, by use of the antecedent "about," it will be understood that the particular value forms another aspect.

"Optional" or "optionally" means that the subsequently described event or circumstance may or may not occur, and that the description includes instances where said event or circumstance occurs and instances where it does not. For example, the phrase "optionally comprising water" means that the composition may comprise water and that the description includes both compositions comprising water and compositions without water.

Throughout this application, where patents are referenced, the disclosures of these patents in their entireties are hereby incorporated by reference into this disclosure.

As used herein, "carbohydrate" means monosaccharides, disaccharides, or trisaccharides where the saccharide exists in the form of a pyranose or furanose (6 or 5 member rings). Non-limiting examples of carbohydrates include glucose, sucrose, lactose, cellobiose, mannose, xylose, ribose, galactose, arabinose, fructose, sorbose, cellotriose and raffinose and the like.

As used herein, "polyol" means acyclic organic compounds derived from carbohydrates where the polyol contains at least 4 carbon atoms. Non-limiting examples of polyols include sorbitol, xylitol, ribitol, mannitol, galactitol, lactitol and the like.

"Plasticizer" is an organic compound added to a high polymer both to facilitate processing and to increase the flexibility and toughness of the final product by internal modification (solvation) of the polymer molecule. The latter is held together by secondary valence bonds; the plasticizer replaces some of these with plasticizer to polymer bonds.

Figure 1:
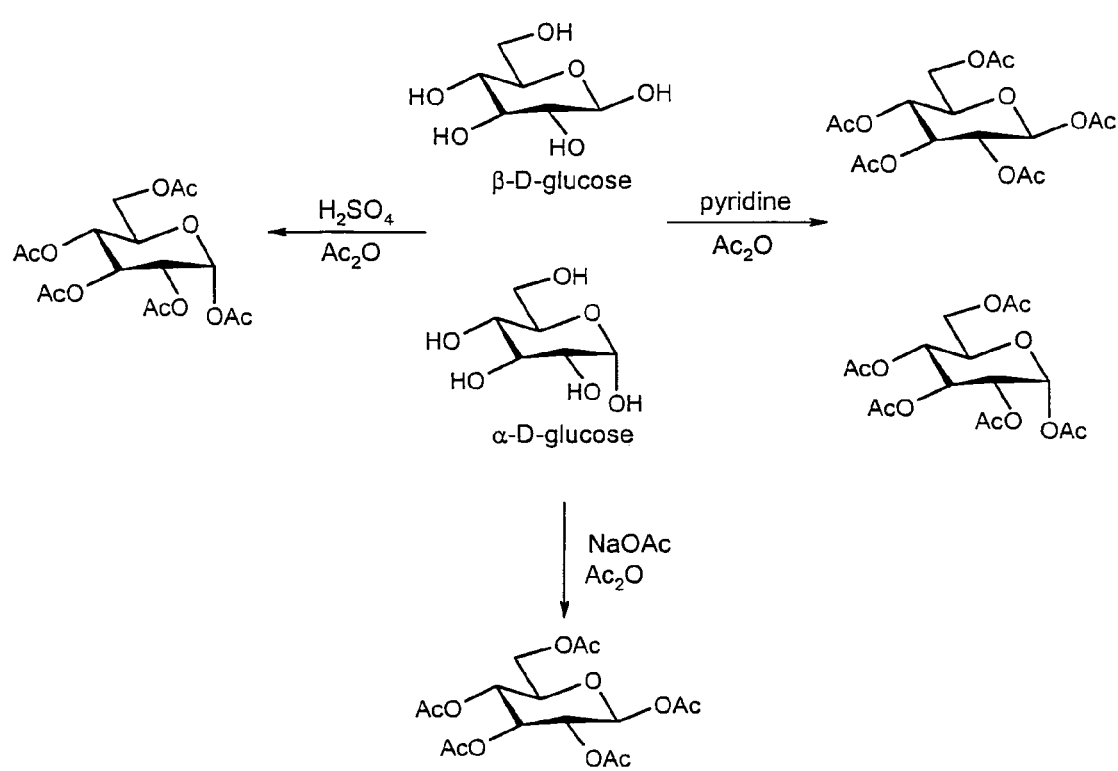
FIG. 1 shows the α and β anomers of glucose and their reactions with acetic anhydride using different catalysts.

In accordance with the present invention, carbohydrates can exist as either the α or β anomers at C1 (FIG. 1). In the case of the α anomer of D-glucose, the $C_1$, $C_2$ hydroxyls are cis to one another. In the case of the β anomer of D-glucose, the $C_1$, $C_2$ hydroxyls are trans to one another.

Unless otherwise noted, it is to be understood that the term "carbohydrate or polyol ester" means the novel plasticizers of this invention that comprise $C_2$–$C_{12}$ organic carbohydrate ester, $C_2$–$C_{12}$ polyol ester and mixtures of $C_2$–$C_{12}$ carbohydrate organic ester and $C_2$–$C_{12}$ polyol ester. In some aspects, the plasticizers consist essentially of $C_3$–$C_{12}$ polyol esters. Still further, the polyol esters can consist essentially of $C_3$–$C_4$ polyol esters.

In one aspect, the invention relates to organic carbohydrate esters (hereinafter "carbohydrate ester") suitable for use as plasticizers for polymers. Those skilled in the art will recognize that organic esters are those based upon carbon containing compounds. Carbohydrates useful in the present invention generally comprise from about 1 to about 3 monosaccharide units. The carbohydrate used to prepare the carbohydrate ester will generally have less than about 10% of contaminants containing a higher or lower number of monosaccharide units. In another aspect, the starting carbohydrate can be monodisperse. Yet still further, the carbohydrate ester does not comprise a phosphate ester such as, for example, a diphenyl phosphate-containing material. As would be recognized by one of ordinary skill in the art, such materials are not considered to be "organic esters."

A broad range of carbohydrates can be used to prepare the carbohydrate esters of the present invention. In separate aspects, such carbohydrates include, but are not limited to, glucose, mannose, galactose, xylose, arabinose, fructose, sorbose, lactose, sucrose, cellobiose, cellotriose and raffinose. The carbohydrate can be in an anhydrous form, a hydrated form or the carbohydrate can be used as a concentrated aqueous solution. For example, if the carbohydrate is glucose, it may be utilized in an anhydrous form or in the form of a corn syrup, that is, glucose in about 30 wt. % or more water. Still further, the monohydrate form of glucose may be utilized. The particular form used depends, at least in part, upon the process used to convert the carbohydrate to the carbohydrate ester. The suitable processes for making the carbohydrate esters herein are discussed in detail below. In one aspect, when a hydrated or aqueous form of carbohydrate is used, the dehydration method of esterfication, as discussed in more detail below, can be useful.

In a further aspect, the invention relates to polyol esters that are suitable for use as plasticizers for polymers. Polyols that can be used to prepare the polyol esters of the present invention are generally derived from carbohydrates containing at least about 4 carbon atoms. In separate, non-limiting, aspects, suitable polyols may comprise one or more of sorbitol, xylitol, ribitol, mannitol, galactitol or lactitol.

The polyol from which the polyol ester is prepared can be in an anhydrous form, a hydrated form or the polyol can be obtained as a concentrated aqueous solution. As with the carbohydrate esters, the form used depends, at least in part, upon the process used to convert the polyol to the polyol ester. Suitable processes are discussed in detail below. Still further, for binary mixtures of cellulose ester and polyol esters, suitable polyols do not comprise sorbitol acetate or xylitol acetate. Yet still further, suitable polyols for such binary mixtures consist essentially of $C_3$ to $C_4$ polyol esters.

In accordance with the present invention, carbohydrate and polyol esters may be obtained that are suitable for use as plasticizers for cellulose esters and other polymers such as PLA or PVC. Such plasticizers may comprise one or more of a $C_3$–$C_{12}$ ester of glucose, mannose, galactose, xylose, arabinose, lactose, cellobiose, a $C_2$–$C_{12}$ ester of mannose, galactose, xylose, arabinose, lactose, cellobiose or a $C_2$–$C_{12}$ ester of sorbitol, mannitol, galactitol, xylitol, and arabinitol.

In separate aspects, the carbohydrate ester may comprise a $C_2$–$C_{12}$ ester, or a $C_2$–$C_{10}$ ester or a $C_3$–$C_8$ ester. Still further, the carbon length of the ester may be from about 2, 3, 4, 5, 6, 7, 8, 9, 10, 11 or 12 where any value can comprise the upper or the lower endpoint, as appropriate.

In one aspect of the invention, the carbohydrate and polyol esters may have at least about 80% of the available hydroxyl groups esterified. Still further, at least about 95% of the available hydroxyl groups may be esterified. Still further, the carbohydrate ester can have at least about 80, 85, 90, 95 or 99% of the available hydroxyl groups esterified, where any value can be used as an upper or a lower endpoint, as appropriate.

In yet another aspect, the carbohydrate and polyol esters of the present invention may have an APHA color value of less than about 300 as measured by ASTM method D 1925, the disclosure of which is incorporated herein in its entirety by this reference. In a further aspect, the APHA color value may be less than about 100. Still further, the APHA color value may be about 25, 50, 75, 100, 125, 150, 175, 200, 250 or 300, with any value forming an upper or a lower endpoint, as appropriate. Yet still further, compositions of the carbohydrate esters and/or polyol esters and cellulose esters have APHA color values of about 25, 50, 75, 100, 125, 150, 175, 200, 250 or 300, with any value forming an upper or a lower endpoint, as appropriate.

In a further aspect, the carbohydrate esters and polyol esters of the present invention will not reach about 10 wt. % weight loss until a temperature of greater than about 150° C., as determined by standard methods of thermal gravimetric analysis. In further separate aspects, the 10 wt. % weight loss does not occur until a temperature greater than about 200° C. is exceeded.

In separate aspects, the carbohydrate esters of the present invention may be derived from one or more of glucose, galactose, mannose, xylose, arabinose, lactose or cellobiose. In separate non-limiting aspects, the ester group may comprise acetate, propionate, butyrate, octanoate or nonanoate. Still further, the carbohydrate esters of the present invention may comprise one or more of α-glucose pentaacetate, β-glucose pentaacetate, α-glucose pentapropionate, β-glucose pentapropionate, α-glucose pentabutyrate and β-glucose pentabutyrate.

In separate aspects, the polyol esters of the present invention may be derived from one or more of sorbitol, xylitol, ribitol, mannitol, galactitol and lactitol. In separate, non-limiting aspects, the ester group may comprise propionate or butyrate. In further separate aspects, the polyol esters of the present invention may comprise one or more of sorbitol hexapropionate or xylitol pentapropionate.

The cellulose esters of the present invention may comprise repeating units of the structure:

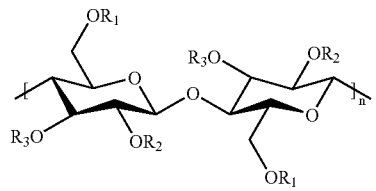

wherein $R^1$, $R^2$ and $R^3$ may be selected independently from the group consisting of hydrogen or straight chain alkanoyl having from 2 to 10 carbon atoms.

The cellulose esters of the present invention can be a cellulose triester or a secondary cellulose ester. Examples of cellulose triesters include cellulose triacetate, cellulose tripropionate and cellulose tributyrate. Examples of secondary cellulose esters include cellulose acetate, cellulose acetate propionate and cellulose acetate butyrate. Such cellulose esters are described in U.S. Pat. Nos. 1,698,049, 1,683,347, 1,880,808, 1,880,560, 1,984,147, 2,129,052 and 3,617,201, the disclosures of which are incorporated herein in their entireties by this reference.

The cellulose esters useful in the present invention can be prepared using techniques known in the art or are commercially available from Eastman Chemical Company, Inc. (Kingsport, Tenn.).

The cellulose esters useful in the present invention generally have a weight average molecular weight (MW) from about 5,000 to about 400,000 as measured by GPC with polystyrene equivalents. Still further, the MW of the cellulose esters may be from about 100,000 to about 300,000. Still further, the MW may be from about 125,000 to about 250,000. Yet further, the MW of the cellulose ester may be from about 100,000, 125,000, 150,000, 175,000, 200,000, 225,000, 250,000, 275,000 or 300,000 where any value may be used as an upper or a lower endpoint, as appropriate.

The DS of the cellulose esters useful herein may be from about 0.7 to about 3.0. In a further aspect, the DS may be from about 1.7 to about 2.8. Yet still further, the DS may be from about 1.9 to about 2.6. Still further, the DS of the cellulose ester can be from about 0.7, 0.9, 1.0, 1.2, 1.4, 1.6, 1.8, 2.0, 2.2, 2.4, 2.6, 2.8 or 3.0, where any value may be used as an upper or a lower endpoint, as appropriate. The particular MW and DS will generally depend upon the particular application in which the cellulose esters are used. In certain cases, as would be recognized by one of ordinary skill in the art, the DS of each acyl substituent can influence the properties of a cellulose mixed ester and, as such, can generally result in an effect on the final properties of an article made from such the cellulose esters.

In separate aspects, cellulose esters that may be used may include one or more of cellulose triacetate (CTA), cellulose acetate (CA), cellulose acetate propionate (CAP), cellulose acetate butyrate (CAB) and the like.

In a further aspect, the invention comprises a composition comprising (A) from about 5 to about 95 wt. % of a $C_2$–$C_{10}$ ester of cellulose; and (B) from about 5 to about 95 wt. % of a $C_2$–$C_{12}$ carbohydrate ester, wherein the carbohydrate comprises of from about 1 to about 3 monosaccharide units, wherein the percentages are based on the weight of component (A) plus component (B). In another aspect of the invention, the amount of cellulose ester may be from about 50 to about 90 wt. % and the amount of $C_2$–$C_{12}$ carbohydrate ester may be from about 50 to about 10 wt. %. Still further, the amount of cellulose ester may be from about 70 to about 85 wt. % and the amount of $C_2$–$C_{12}$ carbohydrate ester may be from about 30 to about 15 wt. %. Further, the amount of cellulose ester may be from about 5, 10, 15, 20, 25, 30, 35, 40, 45, 50, 55, 60, 65, 70, 75, 80, 85, 90 or 95 wt. % of the composition, where any value may be used as an upper or a lower endpoint, as appropriate. Yet still further, the amount of $C_2$–$C_{12}$ carbohydrate ester may be from about 5, 10, 15, 20, 25, 30, 35, 40, 45, 50, 55, 60, 65, 70, 75, 80, 85, 90 or 95 wt. % of the composition, with any value being an upper or a lower endpoint, as appropriate.

In separate non-limiting aspects of the present invention, specific compositions of cellulose esters and carbohydrate esters may include, but are not limited to: cellulose acetate having a DS of from about 0.7 to about 3.0 and glucose pentaacetate; cellulose acetate having a DS of from about 0.7 to about 3.0 and glucose pentapropionate; cellulose acetate propionate having a DS of from about 0.7 to about 3.0 and glucose pentaacetate; cellulose acetate propionate having a DS of from about 0.7 to about 3.0 and glucose pentapropionate; cellulose acetate propionate having a DS of from about 0.7 to about 3.0 and glucose pentabutyrate; cellulose acetate butyrate having a DS of from about 0.7 to about 3.0 and glucose pentaacetate; cellulose acetate butyrate having a DS of from about 0.7 to about 3.0 and glucose pentapropionate; cellulose acetate butyrate having a DS of from about 0.7 to about 3.0 and glucose pentabutyrate; cellulose acetate having a DS of from about 2.7 to about 2.9 and α-glucose pentaacetate; cellulose acetate having a DS of from about 2.7 to about 2.9 and β-glucose pentapropionate; cellulose acetate having a DS of from about 2.4 to about 2.6 and β-glucose pentapropionate; cellulose acetate having a DS of from about 1.9 to about 2.2 and α-glucose pentaacetate; cellulose acetate having a DS of from about 1.9 to about 2.2 and β-glucose pentapropionate; cellulose acetate propionate having a DS of from about 2.5 to about 2.8 and β-glucose pentapropionate; cellulose acetate propionate having a DS of from about 2.5 to about 2.8 and β-glucose pentabutyrate; cellulose acetate butyrate having a DS of from about 2.5 to about 2.8 and β-glucose pentapropionate; and cellulose acetate butyrate having a DS of from about 2.5 to about 2.8 and β-glucose pentabutyrate.

A further aspect of the invention relates to a composition comprising: (A) from about 5 to about 95 wt. % of a $C_2$–$C_{10}$ ester of cellulose; and (B) from about 5 to about 95 wt. % of a $C_3$–$C_{12}$ ester of a polyol, wherein the polyol is derived from a $C_5$ or $C_6$ carbohydrate, and wherein the percentages are based on the weight of component (A) plus component (B). Those skilled in the art will understand that $C_5$ or $C_6$ carbohydrates can be converted to polyols by methods such as by reduction of a $C_1$ aldehyde to an alcohol. In a further aspect of the invention, the amount of cellulose ester in the composition can be from about 70 to about 90 wt. % and the amount of polyol ester may be from about 30 to about 10 wt. %. Still further, the amount of cellulose ester can be from about 70 to about 85 wt. % and the amount of polyol ester can be from about 30 to about 15 wt. %. Further, the amount of cellulose ester may be from about 5, 10, 15, 20, 25, 30, 35, 40, 45, 50, 55, 60, 65, 70, 75, 80, 85, 90 or 95 wt. % of the composition, where any value may be used as an upper or a lower endpoint, as appropriate. Yet still further, the amount of polyol ester may be from about 5, 10, 15, 20, 25, 30, 35, 40, 45, 50, 55, 60, 65, 70, 75, 80, 85, 90 or 95 wt. % of the composition, where any value may be used as an upper or a lower endpoint, as appropriate. In a further aspect, when the composition comprises cellulose ester and a polyol ester, the polyol ester does not comprise a $C_2$ polyol ester. Still further, when combined with cellulose ester, the polyol ester consists essentially of a $C_3$ to $C_4$ polyol, wherein the polyol ester is derived from a $C_5$ to $C_6$ carbohydrate.

In separate non-limiting aspects, compositions of cellulose esters and polyol esters may include: cellulose acetate having a DS of from about 0.7 to about 3.0 and sorbitol hexapropionate; cellulose acetate having a DS of from about 0.7 to about 3.0 and xylitol pentapropionate; cellulose acetate propionate having a DS of from about 0.7 to about 3.0 and sorbitol hexapropionate; cellulose acetate propionate having a DS of from about 0.7 to about 3.0 and sorbitol hexabutyrate; cellulose acetate propionate having a DS of from about 0.7 to about 3.0 and xylitol pentapropionate; cellulose acetate propionate having a DS of from about 0.7 to about 3.0 and xylitol pentabutyrate; cellulose acetate butyrate having a DS of from about 0.7 to about 3.0 and sorbitol hexapropionate; cellulose acetate butyrate having a DS of from about 0.7 to about 3.0 and sorbitol hexabutyrate; cellulose acetate butyrate having a DS of from about 0.7 to about 3.0 and xylitol pentapropionate; cellulose acetate butyrate having a DS of from about 0.7 to about 3.0 and xylitol pentabutyrate; cellulose acetate having a DS of from about 2.7 to about 2.9 and sorbitol hexapropionate; cellulose acetate having a DS of from about 2.7 to about 2.9 and xylitol pentapropionate; cellulose acetate having a DS of from about 2.4 to about 2.6 and sorbitol hexapropionate; cellulose acetate having a DS of from about 2.4 to about 2.6 and xylitol pentapropionate; cellulose acetate propionate having a DS of from about 2.5 to about 2.8 and sorbitol hexapropionate; cellulose acetate propionate having a DS of from about 2.5 to about 2.8 and xylitol pentapropionate;

cellulose acetate propionate having a DS of from about 2.5 to about 2.8 and xylitol pentabutyrate; cellulose acetate propionate having a DS of from about 2.5 to about 2.8 and sorbitol hexabutyrate; cellulose acetate butyrate having a DS of from about 2.5 to about 2.8 and sorbitol hexapropionate; cellulose acetate butyrate having a DS of from about 2.5 to about 2.8 and xylitol pentapropionate; cellulose acetate butyrate having a DS of from about 2.5 to about 2.8 and xylitol pentabutyrate; and cellulose acetate butyrate having a DS of from about 2.5 to about 2.8 and sorbitol hexabutyrate.

It has been found in accordance with the invention herein, that a $C_3$ or $C_4$ ester of a polyol provides surprising results when used as a plasticizer for a cellulose ester. In particular, and as disclosed in Example 17 and 20, infra, polyol esters comprising acetate groups provide inferior plasticizing properties to that of polyol esters comprising other ester groups. In particular, it has been surprisingly found that a polyol ester in which the ester group is not acetate provides better physical properties in articles prepared from compositions comprising such polyol esters and cellulose esters. In particular, as demonstrated in Example 17 and 20, infra, xylitol pentapropionate has been found to be a significantly better plasticizer for cellulose acetate propionate and cellulose acetate butyrate than xylitol pentaacetate.

As set forth in the examples, the carbohydrate ester and polyol ester plasticizers of the present invention are compatible with cellulose esters, thus providing formulations with glass transition temperatures and melt viscosities that may be, at least in part, composition dependent. However, the physical properties of these formulations have been surprisingly found to be very similar to those of the parent cellulose ester. Without being bound by theory, it is believed that the carbohydrate ester may act as a bimodal plasticizer. In contrast, it has been found herein that certain polyol esters provide composition dependent glass transition temperature, melt viscosities and physical properties. That is, the polyol ester is believed to act by the inventors herein, at least in part, as a plasticizing diluent. By combining these components to form ternary mixtures of cellulose ester, carbohydrate ester and polyol ester, novel compositions having low melt viscosities but with physical properties somewhere between cellulose ester/carbohydrate ester and cellulose ester/polyol ester binary mixtures have been obtained.

In one aspect, the carbohydrate ester comprises an α-anomer. Still further, the carbohydrate ester comprises a β-anomer. Yet still further, the carbohydrate ester comprises a mixture of α- and β-anomers. It has been surprisingly found that the particular anomer configuration can effect the suitability of the carbohydrate ester with the cellulose ester. In turn, this can effect the suitability of the particular carbohydrate esters for particular applications.

Accordingly, another aspect of this invention is directed to compositions comprising: (A) from about 5 to about 95 wt. % of a $C_2$–$C_{10}$ ester of cellulose having a DS of about 0.7 to 3.0; (B) from about 1 to about 50 wt. % of a $C_2$–$C_{12}$ ester of polyol, wherein the polyol is derived from a $C_5$ or $C_6$ carbohydrate; and (C) from about 4 to about 94 wt. % of a $C_2$–$C_{12}$ carbohydrate ester, wherein the carbohydrate is comprised of about 1 to about 3 monosaccharide units, and wherein the percentages are based on the weight of component (A) plus component (B) plus component (C). Still further, the amount of cellulose ester may be from about 5, 10, 15, 20, 25, 30, 35, 40, 45, 50, 55, 60, 65, 70, 75, 80, 85, 90 or 95 wt. % of the composition, where any value may be used as an upper or a lower endpoint, as appropriate. Yet still further, the amount of polyol ester may be about 1, 5, 10, 15, 20, 25, 30, 35, 40, 45 or 50 wt. % where any value may be used as an upper or a lower endpoint, as appropriate. Yet still further, the amount of carbohydrate ester may be from 4, 10, 15, 20, 25, 30, 35, 40, 45, 50, 55, 60, 65, 70, 75, 80, 85, 90 or 94 wt. % of the composition, where any value may be used as an upper or a lower endpoint, as appropriate.

In separate non-limiting aspects, ternary compositions of cellulose ester, carbohydrate ester and polyol ester include: cellulose acetate having a DS of from about 0.7 to about 3.0, glucose pentaacetate and xylitol pentapropionate; cellulose acetate having a DS of from about 0.7 to about 3.0, glucose pentapropionate and xylitol pentapropionate; cellulose acetate propionate having a DS of from about 0.7 to about 3.0, glucose pentaacetate and xylitol pentapropionate; cellulose acetate propionate having a DS of from about 0.7 to about 3.0, glucose pentapropionate and xylitol pentapropionate; cellulose acetate butyrate having a DS of from about 0.7 to about 3.0, glucose pentaacetate and xylitol pentapropionate; cellulose acetate butyrate having a DS of from about 0.7 to about 3.0, glucose pentapropionate and xylitol pentapropionate; cellulose acetate butyrate having a DS of from about 0.7 to about 3.0, glucose pentabutyrate and xylitol pentabutyrate; cellulose acetate butyrate having a DS of from about 0.7 to about 3.0, glucose pentabutyrate and sorbitol pentabutyrate; cellulose acetate having a DS of from about 2.7 to about 2.9, α-glucose pentaacetate and xylitol pentapropionate; cellulose acetate having a DS of from about 2.4 to about 2.6, β-glucose pentapropionate and xylitol pentapropionate; cellulose acetate propionate having a DS of from about 2.5 to about 2.8, β-glucose pentapropionate and xylitol pentapropionate; cellulose acetate butyrate having a DS of from about 2.5 to about 2.8, β-glucose pentapropionate and xylitol pentapropionate; and cellulose acetate butyrate having a DS of from about 2.5 to about 2.8, β-glucose pentabutyrate and xylitol pentabutyrate.

In a further aspect of the invention, the amount of cellulose ester in the ternary compositions may be from about 60 to about 90 wt. %, the amount of polyol ester may be from about 5 to about 35 wt. % and the amount of the carbohydrate ester may be from about 5 to about 35 wt. %. Yet further, the amount of cellulose ester may be 60, 65, 70, 75, 80, 85 or 90 wt. %, where any value may form an upper or a lower endpoint, as appropriate. Still further, the amount of polyol ester may be from about 5, 10, 15, 20, 25, 30 or 35 wt. %, where any value may form an upper or a lower endpoint, as appropriate. Still further, the amount of carbohydrate ester may be from about 5, 10, 15, 20, 25, 30 or 35 wt. %, where any value may form an upper or a lower endpoint, as appropriate.

Any of the compositions herein can optionally additionally comprise from about 0.001 to about 50 wt. %, based on total weight of the composition, of at least one additional additive selected from a noncarbohydrate based plasticizer, an aliphatic polyester, an aliphatic-aromatic copolyester, a thermal stabilizer, an antioxidant, a pro-oxidant, an acid scavenger, a UV stabilizer, mineral fillers and starch. Examples of typical plasticizers include diethyl phthalate, dioctyladipate, triethylcitrate, or triphenylphosphate. Examples of polyesters and copolyesters can be found in U.S. Pat. Nos. 5,292,783, 5,589,566 and 5,589,566, the disclosures of which are incorporated herein in their entirety by this reference. Non-limiting examples of fillers include $TiO_2$, $CaCO_3$ and silica.

The novel carbohydrate and polyol esters of this invention also exhibit utility as plasticizers for polymers other than cellulose esters. Non-limiting examples of such polymers include polyesters, polyalkanoates and vinyl polymers. The carbohydrate and polyol esters have been found to have particular utility as plasticizers for polylactic acid (PLA) or polyvinyl chloride (PVC).

Accordingly, an aspect of this invention is directed to a composition comprising: (A) from about 5 to about 95 wt. % of polylactic acid; and (B) from about 5 about 95 wt. % of a $C_2$–$C_{12}$ carbohydrate ester, wherein the carbohydrate comprises from about 1 to about 3 monosaccharide units, and wherein the percentages are based on the weight of component (A) plus component (B). A further aspect of this invention relates to a composition comprising (A) from about 5 to about 95 wt. % of polylactic acid; and (B) from about 5 wt. % to about 95 wt. % of a $C_2$–$C_{12}$ polyol ester, wherein the polyol is derived from a $C_5$ or $C_6$ carbohydrate, and wherein the percentage is based on the weight of component (A) plus component (B). Still further, the amount of polylactic acid may be from about 5, 10, 15, 20, 25, 30, 35, 40, 45, 50, 55, 60, 65, 70, 75, 80, 85, 90 or 95 wt. % of the composition, where any value may be used as an upper or a lower endpoint, as appropriate. Yet still further, the amount of carbohydrate ester or polyol ester may be from about 5, 10, 15, 20, 25, 30, 35, 40, 45, 50, 55, 60, 65, 70, 75, 80, 85, 90 or 95 wt. % of the composition, where any value may be used as an upper or a lower endpoint, as appropriate.

A further aspect of this invention relates to a composition comprising (A) from about 5 to about 95 wt. % of polylactic acid; (B) from about 1 to about 50 wt. % of a $C_2$–$C_{12}$ polyol ester, wherein the polyol is derived from a $C_5$ or $C_6$ carbohydrate; and (C) from about 4 to about 94 wt. % of a $C_2$–$C_{12}$ carbohydrate ester, wherein the carbohydrate comprises from about 1 to about 3 monosaccharide units, and wherein the percentages are based on the weight of component (A) plus component (B) plus component (C). Yet further the amount of polylactic acid may be 60, 65, 70, 75, 80, 85 or 90 wt. %, where any value may form an upper or a lower endpoint, as appropriate. Still further, the amount of polyol ester may be from about 5, 10, 15, 20, 25, 30 or 35 wt. %, where any value may form an upper or a lower endpoint, as appropriate. Still further, the amount of carbohydrate ester may be from about 4, 10, 15, 20, 25, 30, 35, 40, 45, 50, 55, 60, 65, 70, 75, 80, 85, 90 or 94 wt. %, where any value may form an upper or a lower endpoint, as appropriate.

A still further aspect of the invention relates to a composition comprising: (A) from about 5 to about 95 wt. % of polyvinyl chloride; and (B) from about 5 to about 95 wt. % of a $C_2$–$C_{12}$ carbohydrate ester, wherein the carbohydrate comprises from about 1 to about 3 monosaccharide units, and wherein the percentages are based on the weight of component (A) plus component (B). Still further, the amount of polyvinyl chloride may be from about 5, 10, 15, 20, 25, 30, 35, 40, 45, 50, 55, 60, 65, 70, 75, 80, 85, 90 or 95 wt. % of the composition, where any value may be used as an upper or a lower endpoint, as appropriate. Yet still further, the amount of carbohydrate ester may be from about 5, 10, 15, 20, 25, 30, 35, 40, 45, 50, 55, 60, 65, 70, 75, 80, 85, 90 or 95 wt. % of the composition, where any value may be used as an upper or a lower endpoint, as appropriate.

Yet another major aspect of this invention relates to a composition comprising (A) from about 5 to about 95 wt. % of polyvinyl chloride; and (B) from about 5 to about 95 wt. % of a $C_2$–$C_{12}$ polyol ester, wherein the polyol is derived from a $C_5$ or $C_6$ carbohydrate, and wherein the percentage is based on the weight of component (A) plus component (B). Still further, the amount of polyvinyl chloride may be from about 5, 10, 15, 20, 25, 30, 35, 40, 45, 50, 55, 60, 65, 70, 75, 80, 85, 90 or 95 wt. % of the composition, where any value may be used as an upper or a lower endpoint, as appropriate.

Yet still further, the amount of polyol ester may be from about 5, 10, 15, 20, 25, 30, 35, 40, 45, 50, 55, 60, 65, 70, 75, 80, 85, 90 or 95 wt. % of the composition, where any value may be used as an upper or a lower endpoint, as appropriate.

Yet another major aspect of this invention relates to a composition comprising (A) from about 5 to about 95 wt. % of polyvinyl chloride; (B) from about 1 to about 50 wt. % of a $C_2$–$C_{12}$ polyol ester, wherein the polyol is derived from a $C_5$ or $C_6$ carbohydrate; and (C) from about 4 to about 94 wt. % of a $C_2$–$C_{12}$ carbohydrate ester, wherein the carbohydrate comprises from about 1 to about 3 monosaccharide units, and wherein the percentage is based on the weight of component (A) plus component (B) plus component (C). Yet further, the amount of polyvinyl chloride may be about 60, 65, 70, 75, 80, 85 or 90 wt. %, where any value may form an upper or a lower endpoint, as appropriate. Still further, the amount of polyol ester may be from about 5, 10, 15, 20, 25, 30 or 35 wt. %, where any value may form an upper or a lower endpoint, as appropriate. Still further, the amount of carbohydrate ester may be from about 4, 10, 15, 20, 25, 30, 35, 40, 45, 50, 55, 60, 65, 70, 75, 80, 85, 90 or 94 wt. %, where any value may form an upper or a lower endpoint, as appropriate.

A further aspect of the present invention relates to a method of plasticizing a polymer composition. In one aspect, the method comprises introducing a plasticizer into a polymer composition. Still further, the method comprises mixing the plasticizer with the polymer composition. The plasticizer may comprise one or more of the carbohydrate esters or polyol esters of the present invention. The polymer composition may be any one or more of the cellulose esters, polylactic acid, polyvinyl chloride, polyesters, polyalkanoates and vinyl polymers as discussed elsewhere herein.

As used herein, "mixing" encompasses any method for forming a material comprising two or more components, wherein each component is substantially integrated throughout the composition. Any methods of mixing known to a person skilled in the art of chemistry and chemical engineering fall within the meaning of the term "mixing." Examples of suitable methods of mixing are admixing, melt blending and dry blending. Blending may be performed using, e.g., a melt extruder, a kneader extruder, a roll mill, a high shear mixer or a twin-screw compounder.

Another aspect of the present invention relates to an anhydride limited method for preparing $C_2$–$C_{12}$ carbohydrate ester comprising the steps of: (a) combining a carbohydrate, a base catalyst, optionally, a $C_2$–$C_{12}$ acyl acid or mixture thereof, and a limiting portion of a $C_2$–$C_{12}$ acyl anhydride or mixture thereof; (b) contacting the mixture of (a) for a time and at a temperature sufficient to provide a partially esterified carbohydrate; (c) contacting incremental amounts of $C_2$–$C_{12}$ acyl anhydride with reaction mixture (b) for a time and at a temperature sufficient to provide an esterified carbohydrate with a β-anomer content of at least about 50%; and (d) contacting an acid catalyst with reaction mixture (c) for a time and at a temperature sufficient to provide a carbohydrate ester plasticizer in which the β-anomer content established in steps (b) and (c) is essentially unaltered. As used herein, the term "anhydride limited" refers to the addition of incremental amounts of anhydride to step (a). By limiting the amount of anhydride in this manner, it has been found that the exotherm of the reaction may be limited and the color of the product can be improved. In further aspects, the β-anomer content is about 50%, 60%, 70% or 80%, where any value may form an upper or lower endpoint as appropriate.

Another aspect of the present invention relates to a solids limited method for preparing $C_2$–$C_{12}$ carbohydrate ester comprising the steps of: (a) combining a base catalyst, a $C_2$–$C_{12}$ acyl acid or mixture thereof, a $C_2$–$C_{12}$ acyl anhydride or mixture thereof; (b) contacting the mixture of (a) with incremental amounts of carbohydrate for a time and at a temperature sufficient to provide a carbohydrate ester with a β-anomer content of at least about 50%; and (c) contacting an acid catalyst with reaction mixture (b) for a time and at a temperature sufficient to provide a carbohydrate ester in which the β-anomer content established in step (b) is essentially unaltered. As used herein, the term "solids limited" refers to the incremental addition ("limited") addition of solid carbohydrate material in step (b). In accordance with the invention herein, it has been found that such an addition can assist in controlling the exotherm and provides a better color in the final carbohydrate ester. In further aspects, the β-anomer content is about 50%, 60%, 70% or 80%, where any value may form an upper or lower endpoint, as appropriate.

A further aspect of the present invention relates to a dehydration method for preparing $C_2$–$C_{12}$ carbohydrate ester comprising the steps of: (a) combining a concentrated aqueous solution of a carbohydrate or hydrated carbohydrate, a base catalyst, optionally, a $C_2$–$C_{12}$ acyl anhydride or mixture thereof and a $C_2$–$C_{12}$ acyl acid; (b) contacting the mixture of (a) for a time and at a temperature sufficient to cause removal of a water/acyl acid azeotrope and optionally, partial esterification of the carbohydrate; (c) contacting the reaction mixture of (b) with incremental amounts of a $C_2$–$C_{12}$ acyl anhydride for a time and at a temperature sufficient to provide a carbohydrate ester with a β-anomer content of at least about 50%; and (d) contacting an acid catalyst with reaction mixture (c) for a time and at a temperature sufficient to provide a carbohydrate ester in which the β-anomer content established in steps (b) and (c) is essentially unaltered. As used herein, the term "dehydration" refers to the removal of water from step (b) via an azeotrope and/or by reaction with the anhydride. In further aspects, the β-anomer content is about 50%, 60%, 70% or 80%, where any value may form an upper or a lower endpoint, as appropriate.

Yet a further aspect of the invention provides an anhydride limited method for preparing $C_2$–$C_{12}$ carbohydrate ester comprising the steps of: (a) combining a carbohydrate, an acid catalyst, optionally, a $C_2$–$C_{12}$ acyl acid or mixture thereof and a limiting portion of a $C_2$–$C_{12}$ acyl anhydride or mixture thereof; (b) contacting the mixture of (a) for a time and at a temperature sufficient to provide a partially esterified carbohydrate; (c) contacting incremental amounts of $C_2$–$C_{12}$ acyl anhydride with reaction mixture (b) for a time and at a temperature sufficient to provide an esterified carbohydrate with an α-anomer content of at least about 50%; and (d) contacting a base catalyst with reaction mixture (c) for a time and at a temperature sufficient to provide a carbohydrate ester plasticizer in which the α anomer content established in steps (b) and (c) is essentially unaltered. In further aspects, the α anomer content established in step (b) is about 50%, 60%, 70%, 80% or 90%, where any value can form an upper or lower endpoint, as appropriate.

Another aspect of the invention provides a solids limited method for preparing $C_2$–$C_{12}$ carbohydrate esters comprising the steps of: (a) combining an acid catalyst, a $C_2$–$C_{12}$ acyl acid or mixture thereof and a $C_2$–$C_{12}$ acyl anhydride or mixture thereof; (b) contacting the mixture of (a) with incremental amounts of carbohydrate for a time and at a temperature sufficient to provide a carbohydrate ester with an α-anomer content of at least about 50%; and (c) contacting a base catalyst with reaction mixture (b) for a time and at a temperature sufficient to provide a carbohydrate ester in which the α-anomer content established in step (b) is essentially unaltered. In further aspects, the α-anomer content established in step (b) is about 50%, 60%, 70%, 80% or 90%, where any value may form an upper or lower endpoint, as appropriate.

A further aspect of the present invention provides a dehydration method for preparing $C_2$–$C_{12}$ carbohydrate ester comprising the steps of: (a) combining a concentrated aqueous solution of a carbohydrate or hydrated carbohydrate, an acid catalyst, optionally, a $C_2$–$C_{12}$ acyl anhydride or mixture thereof and a $C_2$–$C_{12}$ acyl acid or a mixture thereof; (b) contacting the mixture of (a) for a time and at a temperature sufficient to cause removal of a water/acyl acid azeotrope and, optionally, partial esterification of the carbohydrate; (c) contacting the reaction mixture of (b) with incremental amounts of a $C_2$–$C_{12}$ acyl anhydride for a time and at a temperature sufficient to provide a carbohydrate ester with an anomer content of at least about 50%; and (d) contacting a base catalyst with reaction mixture (c) for a time and at a temperature sufficient to provide a carbohydrate ester in which the α-anomer content established in step (b) is essentially unaltered. In further aspects, the α-anomer content established in step (b) is about 50%, 60%, 70%, 80% or 90%.

An further aspect of the invention provides an anhydride limited method for preparing $C_2$–$C_{12}$ polyol ester comprising the steps of: (a) combining a polyol, a catalyst, optionally a $C_2$–$C_{12}$ acyl acid or mixture thereof and a limiting portion of a $C_2$–$C_{12}$ acyl anhydride or mixture thereof; (b) contacting the mixture of (a) for a time and at a temperature sufficient to provide a partially esterified polyol; and (c) contacting incremental amounts of $C_2$–$C_{12}$ acyl anhydride with reaction mixture (b) for a time and at a temperature sufficient to provide a $C_2$–$C_{12}$ polyol ester.

Another major aspect of the invention provides a solids limited method for preparing $C_2$–$C_{12}$ polyol ester plasticizers comprising the steps of: (a) combining a catalyst, a $C_2$–$C_{12}$ acyl acid or mixture thereof or a $C_2$–$C_{12}$ acyl anhydride or mixture thereof; and (b) contacting the mixture of (a) with incremental amounts of polyol for a time and at a temperature sufficient to provide a $C_2$–$C_{12}$ polyol ester.

A further aspect of the present invention provides a dehydration method for preparing $C_2$–$C_{12}$ polyol ester comprising the steps of: (a) combining a concentrated aqueous solution of a polyol or hydrated polyol, a catalyst, optionally a $C_2$–$C_{12}$ acyl anhydride or mixture thereof and a $C_2$–$C_{12}$ acyl acid or a mixture thereof; (b) contacting the mixture of (a) for a time and at a temperature sufficient to cause removal of a water/acyl acid azeotrope and optionally, partial esterification of the polyol; and (c) contacting the reaction mixture of (b) with incremental amounts of a $C_2$–$C_{12}$ acyl anhydride for a time and at a temperature sufficient to provide a $C_2$–$C_{12}$ polyol ester.

In preparing the carbohydrate or polyol esters, acyl anhydrides may be used. Suitable acyl anhydrides can comprise straight chain, aliphatic anhydrides. Examples of particular, non-limiting, acyl anhydrides include acetic anhydride, propionic anhydride, butyric anhydride, pentanoic anhydride, hexanoic anhydride and the like.

In preparing the carbohydrate or polyol esters, acyl acids can be used. Suitable acyl acids comprise straight chain, aliphatic acids. Examples of particular, non-limiting, acyl acids include acetic acid, propionic acid, butyric acid, pentanoic acid, hexanoic acid and the like. In preparing the carbohydrate or polyol esters the acyl acid can correspond to the acyl anhydride.

In one aspect, the total amount of acyl anhydride utilized to prepare the carbohydrate esters or polyol esters of the present invention may be from about 0.8 to about 2 hydroxyl equivalents where hydroxyl equivalents may be calculated by multiplying the moles of carbohydrate or polyol by the number of hydroxyl groups available for esterification. In a further aspect, the total amount of acyl anhydride can be from about 0.9 to about 1.2 hydroxyl equivalents. In a further aspect, if the carbohydrate or polyol contains water, extra amounts of acyl anhydride will generally be required due to hydrolysis of the anhydride. In this case, the amount of acyl anhydride can be from about 1.0 to about 1.3 hydroxyl equivalents.

Catalysts useful for the preparation of the carbohydrate or polyol esters of the present invention include NaOAc, KOAc, $ZnCl_2$, $FeCl_3$, $HClO_4$, MSA, $H_2SO_4$ and the like. Non-limiting examples of suitable base catalysts include sodium metal, potassium metal, NaOH, KOH, $Ca(OH)_2$, $Na_2CO_3$, $K_2CO_3$, $CaCO_3$, Na salts of carboxylic acids, K salts of carboxylic acids and Ca salts of carboxylic acids. Non-limiting examples of suitable acid catalysts include p-toluene sulfonic acid, methane sulfonic acid, ethane sulfonic acid, benzene sulfonic acid and $HClO_4$.

In some aspects, it might be beneficial to utilize calcium salt catalysts. The calcium salts of acyl acids can be preformed or they can be prepared in situ prior to or during the reaction. A preference for Ca base catalysts in some circumstances is based on the observation in the invention herein that these materials can catalyze esterification of carbohydrates or polyols without causing decomposition of the starting material and formation of color in the carbohydrate or polyol ester. Further, because of their limited solubility in the reaction medium, Ca base catalysts have been found to generally not cause excessive or uncontrollable exotherms during the reaction, thereby providing a more controllable and safe process. Furthermore, residual Ca catalyst in the carbohydrate or polyol esters has been found to not result in subsequent MW loss and coloring of the cellulose ester during thermal processing to make a shaped object.

Additionally, it has been found herein that in carbohydrate esterification reactions, Ca base catalysts can provide preferential formation of the β-anomer. The exact β-anomer content is believed to depend, at least in part, upon the carbohydrate being esterified, the reaction temperature, the reaction time, the particular acyl anhydride used for esterification and the method used to isolate the carbohydrate ester. In certain aspects of the methods of this invention, the amount of β-anomer in the carbohydrate ester can range from about 95% to about 50%. Still further, the amount of β-anomer in the carbohydrate ester can range from about 80% to about 60%. Still further, the β-anomer content can be 50, 55, 60, 65, 70, 75, 80, 85, 90 or 95%, where any value can form an upper or a lower end point, as appropriate. The configuration at the anomeric center is relevant due to the finding that, in certain cases, the anomeric configuration can impact the compatibility of the carbohydrate ester with a polymer and thereby effect the physical properties of polymer formulations.

In certain aspects, the catalysts for preparing carbohydrate or polyol esters can comprise p-toluene sulfonic acid and methane sulfonic acid. Methane sulfonic acid may be useful when an acid catalyst is used in combination with Ca base catalysts. Surprisingly, with the use of base catalysts during an early part of the esterification reaction, the initial stage of the reaction is relatively fast, whereas the latter stage of the reaction is very slow. In order to obtain complete or substantially complete esterification, it can be necessary to use longer reaction times or higher reaction temperatures, which causes the formation of a colored product. In one aspect, this difficulty can be overcome by conducting the initial part of the reaction using a Ca salt as the catalyst and the latter part of the reaction using MSA as the catalyst. Completing the reaction with a Ca salt can provide good thermal stability needed for melt processing. In the case of carbohydrate esters, the high β-anomer content established in the initial reaction stage with the Ca salt base catalyst was found to not be significantly changed by the addition of the MSA acid catalyst. That is, the α/β-anomers generally do not equilibrate under the reaction conditions, thus resulting in a high β content in the final ester.

Conversely, when it is desirable to make a carbohydrate ester with high α-content and with good thermal stability, the initial stage of the reaction may be conducted using MSA and the last stage of the reaction may be conducted using Ca salts. With this aspect, it is believed that equilibration of the α- and β-anomers normally does not occur.

The amount of acid or base catalyst used in the initial stage of the reaction may be from about 0.0001 to about 0.2 equivalents based on moles of carbohydrate or polyol in the reaction. Still further, the amount of acid or base catalyst in the initial stage of the reaction may be from about 0.003 to about 0.01 equivalents. The amount of acid or base catalyst used in the second stage of the reaction may be expressed in terms of molar equivalents of carbohydrate or polyol after neutralization of the acid or base catalyst used in the first stage. The amount of acid or base catalyst used in the second stage of the reaction may be from about 0.0001 to about 0.1 equivalents. Still further, the amount of acid or base catalyst in the second stage of the reaction may be from about 0.001 to about 0.01 equivalents.

In one aspect relating to the anhydride-limited method, the amount of acyl anhydride in step (a) may be from about 0.01 to about 0.4 hydroxyl equivalents. A more limiting amount of anhydride in step (a) may be from about 0.1 to about 0.3 hydroxyl equivalents.

In one aspect relating to the solids limited method, the amount of carboxylic acid in step (a) may be from about 0.1 to about 25 wt. %, based on the total weight of the acyl anhydride utilized in the reaction. In a separate aspect, the amount of acyl anhydride may be from about 2 to about 10 wt. % of carboxylic acid. Still further, the amount of carboxylic acid may be 0.1, 2, 5, 7, 10, 12, 15, 17, 20, 22 or 25 wt. %, where any value can be used as an upper or lower endpoint, as appropriate.

In one aspect relating to the dehydration method, the amount of carboxylic acid or anhydride required in step (a) will be related to the amount of water in the aqueous solution, the water/carboxylic acid content of the azeotrope, the degree to which the carbohydrate is esterified and the amount of carboxylic acid required to maintain a slurry of carbohydrate. In a further aspect, the amount of carboxylic acid or anhydride may be that which will provide from about 5 to about 150 wt. % of carboxylic acid or anhydride based on weight of carbohydrate after removal of the water. In a further aspect, the amount of carboxylic acid or anhydride may be the amount that will provide about from about 25 to about 45 wt. % of carboxylic acid based on weight of carbohydrate after removal of the water.

In preparation of the carbohydrate and polyol esters of the present invention, the temperature at which the esterification reaction is conducted may be from about 60 to about 120°

C. In a separate aspect, the esterification reaction may be conducted at from about 75 to about 100° C. Still further, the esterification reaction may be conducted at from about 80 to about 90° C. It should be noted that the precise temperature at which the esterification reaction is conducted will depend upon a number of factors, including, but not limited to, the particular acyl anhydride that is utilized, the carbohydrate or polyol being esterified and the type and amount of catalyst used in the reaction.

Additionally, the time for the esterification reaction will normally depend upon a number of factors such as reaction temperature, catalyst type, catalyst loading, type of carbohydrate or polyol and the like. With shorter reaction times, less color is generally generated in the product. In one aspect of the present invention, the reaction time may be less than about 24 h. In a further aspect, the reaction time may be less than about 10 h. The appropriate times and temperatures for the reactions may be readily determined by one of ordinary skill in the art without undue experimentation.

The reaction mixture may be contacted with color reducing agents such as carbon powder so as to reduce color produced during the course of the reaction. Additionally, in some circumstances, it may be desirable to remove excess carboxylic acid from the product. In the case of crystalline carbohydrate or polyol acetates (e.g. glucose pentaacetate), one method for such removal can be distillation to remove bulk acetic acid followed by the addition of a nonsolvent to precipitate the product and to remove the residual acetic acid. However, many of the other carbohydrate and polyol esters prepared in accordance with the present invention are viscous liquids. Although the bulk of the acyl acid can be removed by distillation (e.g., about 80–90 wt. %), removal of the remaining acyl acid generally requires low or very low vacuums, elevated temperatures and long distillation times which can result in undesirable color in the carbohydrate or polyol esters. It is generally important that even small amounts of residual acyl acid in the liquid carbohydrate or polyol ester plasticizers be removed because acyl acid can cause unacceptable odors, the generation of additional color, lowering of molecular weight of a polymer composition including the carbohydrate or polyol ester and loss of physical properties of a polymer composition during thermal processing. Additionally, the crystalline carbohydrate or polyol acetates generally exhibit good solubility in weak aqueous acetic acid and, accordingly, it may be necessary to remove the acetic acid prior to addition of the nonsolvent in order to obtain reasonable yields of product.

In another aspect of the invention, carbohydrate or polyol esters having very low levels of acyl acid can be obtained under very mild conditions by the distillation of a water/acyl acid azeotrope from the carbohydrate or polyol ester plasticizers. Quite surprisingly, very little, if any, hydrolysis of the carbohydrate or polyol esters is observed using this process. In separate aspects, the water/acyl azeotopes are water/acetic acid, propionic acid, butyric acid, pentanoic acid and hexanoic acid. The reaction temperatures and times will generally depend on the reaction pressure, the composition of the azeotrope and the degree of saturation of the plasticizer with water. In a particular aspect of the invention, sufficient water to saturate the carbohydrate or polyol ester plasticizer may be added in multiple portions. The azeotrope may then be removed at a temperature and pressure less than about 100° C. and about 760 mm Hg. In further aspects, temperatures and pressures may be less than about 60° C. and about 60 mm Hg. In a further aspect, the amount of carboxylic acid remaining in the carbohydrate or polyol ester plasticizer after azeotropic distillation may be less than about 1 wt. %, based on weight of the carbohydrate or polyol ester. In a further aspect, less than about 0.5 wt. % of carboxylic acid remains in the carbohydrate or polyol ester.

After removal of the carboxylic acid by azeotropic distillation, the crystalline carbohydrate or polyol esters (e.g., glucose pentaacetate) can be isolated by the addition of a nonsolvent or by extrusion of the molten mass into a nonsolvent such as water as would be known to one of ordinary skill in the art. The amorphous, liquid carbohydrate or polyol esters can be used without further purification. In another aspect of this invention, compositions comprising carbohydrate or polyol esters and cellulose esters, polylactic acid or polyvinyl chloride or other polymers can be converted to shaped articles such as film, molded objects and fibers.

In one aspect, a film may be prepared by casting from an appropriate solvent, by melt compression, by melt extrusion and the like. The specific polymer compositions, solvents and processing conditions will generally depend on the intended applications and desired physical properties. As such, a broad composition range and processing window is anticipated. However, such conditions may be readily determined by one of ordinary skill in the art without undue experimentation.

The film can be in the form of thin film or as thick sheet. The film may be optically clear or nearly clear unless additives are utilized to deliberately make the film nonclear. The compositions have been found to provide thermally stable films with little or no loss of plasticizer resulting from plasticizer volatility or migration. Thin films prepared from the novel compositions may be particularly well suited for applications such as clear packaging, tape backing, film backing and as protective film for liquid crystal displays. Thick sheets formed from the compositions of this invention can be particularly well suited for applications such as eyeglass frames, safety glasses, outdoor optical displays, tool parts and the like. Often, these objects may be cut or stamped from an extruded thick sheet.

In another aspect, molded objects can be prepared by injection or compression molding and the like. In separate aspects, the specific compositions and processing conditions will generally depend on the intended applications and desired physical properties. As such, a broad composition range and processing window is anticipated. However, such conditions may be readily determined without undue experimentation by one of ordinary skill in the art.

Non-limiting examples of objects that may be prepared by molding the compositions of this invention include toothbrush handles, toys, automotive trim, tool handles, camera parts, razor parts, pen barrels, bottles, electronic housing, food bins, CD jewel cases, medical tools and connectors, small appliance housing and parts, large appliance housing and parts, dishware, cutlery and the like.

In yet another aspect, fibers comprised of the compositions may be prepared by spinning from an appropriate solvent or by thermal extrusion of fibers. The specific compositions, methods for forming of fibers, spinning solvents and the processing conditions will generally depend on the intended applications and desired physical properties. As such, a broad composition range and processing window is anticipated. However, the specific conditions may be readily determined by one of ordinary skill in the art without undue experimentation.

The fibers prepared from the novel compositions of this invention are generally useful for the preparation of clothing, filtration devices, diaper top sheet, sanitary napkins, surgical clothing, hygiene articles, geotextiles and composites.

One aspect of this invention relates to the melt extrusion of a thin film suitable for coating with an adhesive such that the film can be used as adhesive tape. In a further aspect, the novel compositions that may be used for a clear tape backing comprise a cellulose acetate with a DS of from about 2.2 to about 2.8 or from about 2.4 to about 2.6 comprising from about 5 to about 50 wt. % or from about 10 to about 35 wt. % of a carbohydrate or polyol ester. When a carbohydrate ester is used, it may comprise glucose pentaacetate or glucose pentapropionate. Still further, the compositions that may be used for clear tape backing comprise cellulose acetate having a DS of from about 2.3 to about 2.7 or from about 2.4 to about 2.5 comprising from about 5 to about 50 wt. % or from about 15 to about 30 wt. % of β-glucose pentapropionate. In yet a further aspect, the novel composition should be sufficiently thermally stable so that the film for clear tape backing can be melt extruded at a temperature from about 230 to about 290° C. so as to provide a substantially noncolored film. Still further, the film has a thickness from about 0.01 to about 3 mm or from about 0.1 to about 1 mm.

In a further aspect of the invention, a solvent cast film suitable for use as photographic and movie film backing is provided. In one aspect, the composition used for photographic and movie film backing can comprise cellulose acetate with a DS of from about 2.4 to about 3.0 or from about 2.6 to about 2.9 comprising from about 5 to about 50 wt. % or from about 5 to about 35 wt. % of a carbohydrate or polyol ester. Non-limiting examples of carbohydrate or polyol esters are one or more of glucose pentaacetate, glucose pentapropionate, sorbitol hexapropionate, xylitol pentapropionate or a mixture of glucose pentapropionate/sorbitol hexapropionate or glucose pentapropionate/xylitol pentapropionate. In yet a further aspect, the photographic and movie film backing comprises cellulose acetate having a DS of from about 2.7 to about 2.9 comprising from about 10 to about 30 wt. % of α-glucose pentaacetate or β-glucose pentapropionate. Still further, the solvent for casting of photographic and movie film backing may comprise a mixture of methylene chloride and methanol and, optionally, may comprise additional solvents. In a further aspect, the ratio of methylene chloride/methanol may comprise from about 95/5 to about 85/15 and the concentration of cellulose acetate in the solvent may comprise from about 7 to about 15 wt. %. Still further, the photographic and movie film backing may have a thickness from about 0.01 to about 3 mm or from about 0.1 to about 1.0 mm.

In a still further aspect of the invention, solvent casting of film suitable for use as protective film for liquid crystal displays is provided. In one aspect, the composition used for protective film can comprise cellulose acetate having a DS of from about 2.4 to about 3.0 or cellulose acetate propionate having a DS of from about 2.6 to about 2.9 comprising from about 5 to about 35 wt. % of a carbohydrate or polyol ester, wherein the carbohydrate or polyol esters comprise glucose pentaacetate, glucose pentapropionate, sorbitol hexapropionate, xylitol pentapropionate and/or a mixture of glucose pentapropionate/sorbitol hexapropionate or glucose pentapropionate/xylitol pentapropionate. In a particular aspect, one composition for the protective film can comprise cellulose acetate having a DS of from about 2.7 to about 2.9 comprising from about 5 to about 30 wt. % of β-glucose pentapropionate. One solvent that may be used for casting of the protective film may comprise a mixture of methylene chloride and methanol and, optionally, additional solvents may be present. A ratio of methylene chloride/methanol may be from about 95/5 to about 85/15. A concentration of cellulose acetate in the solvent may be from about 7 to about 15 wt. %.

The protective film may have a thickness from about 0.01 to about 3 mm or from about 0.1 to about 1.0 mm. The protective film may have a uniform film surface suitable for coating with an adhesive. Also, the adhesive coated protective film can have good or excellent adhesion to the polarizing layers used in liquid crystal displays. Particularly useful is when the adhesive coated protective film demonstrates good adhesion to polyvinyl acetate.

Composites are structures comprising natural cellulose fibers and a polymer matrix component wherein the fiber component comprises at least about 30 wt. % of the composite structure. Examples of articles of composite construction are disclosed in U.S. Pat. Nos. 4,474,846, 5,883,025, 6,123,172, 6,184,272, the disclosures of which are incorporated herein in their entireties by this reference. Such composites are used, for example, in the automotive industry for package trays, interior door trim, rear window shelves, seat backs, carpet backing and acoustic insulation. Other uses for composite structures containing natural cellulose fibers include such articles as flowerpots, moldings, railroad ties, furniture, marine piers, acoustic insulation, packaging and other building and consumer products.

One known method for producing composite structures is to mold, using heat and pressure, a natural cellulose fiber/polymer powder mixture. Another method used in the art to prepare composite structures involves molding a non-woven or multi-layered fiber structure, which may contain the natural cellulose fiber and polymer fiber as well as any mineral fillers and colorants, into a desired product. Application of heat and pressure in the molding fuses the fibrous components to form the composite structure. A unified composite article may be formed with tensile, stiffness, impact and surface properties necessary for the desired end uses. In each of these cases, the polymer component acts as the matrix for the reinforcing natural fiber.

In order to use cellulose esters as the polymer matrix component, it is generally necessary to add a plasticizer to the cellulose ester prior to forming the composite structure. Plasticizers can generally be incorporated by compounding and thermally spinning a plasticized cellulose ester fiber. Alternatively, the cellulose ester fiber can be solvent spun and the plasticizers can be added to the cellulose ester/natural fiber mixture externally prior to molding the composite structure. In either case, the plasticizer will generally become distributed between the cellulose ester matrix and the natural cellulose ester fiber. That is, the plasticizer migrates from the cellulose ester matrix leading to variable physical properties and a general deterioration of the composite structure physical properties over time.

The carbohydrate and polyol esters of the present invention are generally non-volatile and, in comparison to plasticizers that are used for cellulose esters or other polymers, under normal conditions of use, do not migrate from the cellulose ester in which it is used. Accordingly, one aspect of the invention is the use of the fibers comprising the compositions of this invention in composite structure.

In one aspect, the novel composition comprising the fibers used in a composite matrix can comprise cellulose acetate having a DS of from about 1.9 to about 2.6, cellulose acetate propionate having a DS of from about 2.5 to about 2.8, or cellulose acetate butyrate having a DS of from 2.5 to about 2.8 containing from about 10 to about 35 wt. % of a carbohydrate or polyol ester wherein the carbohydrate or polyol esters may comprise one or more of glucose pentaacetate, glucose pentapropionate, glucose pentabutyrate, sorbitol hexapropionate, xylitol pentapropionate or mixtures of glucose pentaacetate/sorbitol hexapropionate, glucose pentapropionate/sorbitol hexapropionate, glucose pentapropionate/xylitol pentapropionate, glucose pentabutyrate/sorbitol hexapropionate, glucose pentabutyrate/xylitol pentapropionate, glucose pentabutyrate/xylitol pentabutyrate, and glucose pentabutyrate/sorbitol hexabutyrate. Still further, compositions may comprise one or more of cellulose acetate having a DS of from about 2.4 to about 2.6 and α-glucose pentaacetate, cellulose acetate having a DS of from about 2.4 to about 2.6 and β-glucose pentapropionate, cellulose acetate having a DS of from about 2.4 to about 2.6 and xylitol pentapropionate, cellulose acetate having a DS of from about 2.4 to about 2.6, β-glucose pentapropionate and sorbitol hexapropionate, cellulose acetate having a DS of from about 2.4 to about 2.6, β-glucose pentapropionate and xylitol pentapropionate, cellulose acetate propionate having a DS of from about 2.5 to about 2.8 and β-glucose pentapropionate, cellulose acetate propionate having a DS of from about 2.5 to about 2.8 and xylitol pentapropionate, cellulose acetate propionate having a DS of from about 2.5 to about 2.8, β-glucose pentapropionate and sorbitol hexapropionate, cellulose acetate propionate having a DS of from about 2.5 to about 2.8, β-glucose pentapropionate and xylitol pentapropionate, cellulose acetate propionate having a DS of from about 2.5 to about 2.8 and β-glucose pentabutyrate, cellulose acetate propionate having a DS of from about 2.5 to about 2.8, β-glucose pentabutyrate and sorbitol hexabutyrate, cellulose acetate propionate having a DS of from about 2.5 to about 2.8, β-glucose pentabutyrate and xylitol pentapropionate, cellulose acetate butyrate having a DS of from about 2.5 to about 2.8 and β-glucose pentapropionate, cellulose acetate butyrate having a DS of from about 2.5 to about 2.8 and xylitol pentapropionate, cellulose acetate butyrate having a DS of from about 2.5 to about 2.8 and xylitol pentabutyrate, cellulose acetate butyrate having a DS of from about 2.5 to about 2.8, β-glucose pentapropionate and sorbitol hexapropionate, cellulose acetate butyrate having a DS of from about 2.5 to about 2.8, β-glucose pentapropionate and xylitol pentapropionate, cellulose acetate butyrate having a DS of from about 2.5 to about 2.8 and β-glucose pentabutyrate, cellulose acetate butyrate having a DS of from about 2.5 to about 2.8, β-glucose pentabutyrate and sorbitol hexapropionate, and cellulose acetate butyrate having a DS of from about 2.5 to about 2.8, β-glucose pentapropionate and xylitol pentabutyrate.

In one aspect, the natural fibers of the composite structure may comprise one or more of hemp, sisal, flax, kenaf, cotton, abaca, jute, kapok, papyrus, ramie, coconut (coir), wheat straw, rice straw, hardwood pulp, softwood pulp or wood flour. A suitable fiber length for the natural cellulose fiber component of this invention may be from about 0.01 to about 10.2 cm or from about 0.5 to about 5.0 cm.

The composite structure may also comprise from at least about 30 wt. % natural fiber. Still further, the natural fiber may be from about 60 to about 75 wt. %, with the balance comprising the compositions of this invention and, optionally, containing other polymer additives.

In one aspect, the method of forming the composites and the processing conditions can depend on the intended applications and desired physical properties. As such, a broad composition range and processing window is anticipated. The appropriate parameters can be readily determined by one of ordinary skill in the art without undue experimentation.

As set forth in the examples, shaped articles comprising cellulose esters and the carbohydrate and polyol esters of the invention have been found to exhibit a heat deflection temperature (HDT) higher than that which can be obtained from articles of cellulose ester formulations that do not comprise the carbohydrate and polyol esters of the present invention. Accordingly, one aspect of this invention relates to compositions of cellulose esters and carbohydrate or polyol esters of the present invention, which provide shaped articles with a HDT greater than about 90° C. at 66 psi. Still further, compositions of cellulose esters and carbohydrate or polyol esters of the present invention provide shaped articles with a HDT greater than about 100° C. at 66 psi. Yet still further, the HDT compositions comprise cellulose acetate having a DS of from about 0.7 to about 3.0 or cellulose acetate propionate having a DS of from about 0.7 to about 3.0, wherein the cellulose acetate propionate has a DS of acetyl from about 0.4 to about 2.7 and a DS of propionyl from about 0.3 to about 2.6 and from about 5 to about 20 wt. % of a carbohydrate or polyol ester as disclosed elsewhere herein. The cellulose esters comprise cellulose acetate having a DS of from about 2.0 to about 2.7 and cellulose acetate propionate having a DS of from about 2.5 to about 2.8 wherein the cellulose acetate propionate has a DS of acetyl from about 1.7 to about 2.1 and a DS of propionyl of from about 0.4 to about 1.1. The carbohydrate or polyol esters used in articles having superior heat deflection temperatures comprise one or more of glucose pentaacetate, glucose pentapropionate, glucose pentabutyrate, sorbitol hexapropionate, xylitol pentapropionate, glucose pentaacetate/sorbitol hexapropionate, glucose pentapropionate/sorbitol hexapropionate, glucose pentapropionate/xylitol pentapropionate, glucose pentabutyrate/sorbitol hexapropionate, glucose pentabutyrate/xylitol pentapropionate, glucose pentabutyrate/xylitol pentabutyrate, or glucose pentabutyrate/sorbitol hexabutyrate. Still further, the compositions comprise one or more of cellulose acetate having a DS of from about 2.4 to about 2.6 and α-glucose pentaacetate, cellulose acetate having a DS of from about 2.4 to about 2.6 and β-glucose pentapropionate, cellulose acetate having a DS of from about 2.4 to about 2.6 and xylitol pentapropionate, cellulose acetate having a DS of from about 2.4 to about 2.6, β-glucose pentapropionate and sorbitol hexapropionate, cellulose acetate having a DS of from about 2.4 to about 2.6, β-glucose pentapropionate and xylitol pentapropionate, cellulose acetate propionate having a $DS_{Ac}$ of from about 1.8 to about 2.0 and a $DS_{Pr}$ of from about 0.6 to about 0.8 and β-glucose pentapropionate, cellulose acetate propionate having a $DS_{Ac}$ of from about 1.8 to about 2.0 and a $DS_{Pr}$ of from about 0.6 to about 0.8 and xylitol pentapropionate, cellulose acetate propionate having a $DS_{Ac}$ of from about 1.8 to about 2.0 and a $DS_{Pr}$ of from about 0.6 to about 0.8, β-glucose pentapropionate and xylitol pentapropionate, and cellulose acetate propionate having a $DS_{Ac}$ of from about 1.8 to about 2.0 and a $DS_{Pr}$ of from about 0.6 to about 0.8, β-glucose pentapropionate and sorbitol hexapropionate.

Another aspect of this invention is related to shaped articles prepared from the compositions of this invention, wherein the article has a HDT greater than about 90° C. at 66 psi. Still further, the shaped articles may have a HDT greater than about 100° C. at 66 psi. The shaped articles may be in the form of a film, molded article or a fiber. Non-limiting examples of shaped articles having superior heat deflection temperatures include, but are not limited to, dishwater safe articles, articles which can be autoclaved and articles which are exposed to extreme weather conditions. Non-limiting examples of dishwater safe articles include baby bottles, glasses, cups, bowels, plates, kitchen appliances and cutlery. Non-limiting examples of articles, which can be autoclaved, include medical devices, tubing, filtration devices, trays and dishes. Non-limiting examples of items that can be exposed to extreme weather conditions include automotive interior parts, jewel cases for compact discs, electronic housing, outdoor optical displays, liquid crystalline displays, photographic film and automotive trim.

In some aspects, the HDT of the shaped articles of the present invention may be substantially increased by the addition of fillers such as fiberglass, natural fibers, mineral fillers and the like. One of ordinary skill in the art would understand which materials may be useful in this aspect.

The invention will now be described in greater detail by reference to the following non-limiting examples.

EXAMPLES

The following examples are put forth so as to provide those of ordinary skill in the art with a complete disclosure and description of how the compounds, compositions, articles, devices, and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric.

General Methods

The tensile strength, break to elongation and modulus of the films were measured by ASTM method D882; the tear force was measured by ASTM method D1938. The tensile strength and elongation at break for molded pieces were measured by ASTM method D638; the flexural strength and modulus by ASTM method D790; the Izod impact strength by ASTM method D256. The color of the plasticizers was measured by ASTM D1925.

The weight % of carboxylic acid in the carbohydrate or polyol ester was determined by HPLC. The column was a Polymer Labs PLGel 5 μm and the detector was an evaporative light scattering detector. The injection volume was 20 μL and the flow rate was 1.0 mL/min. The mobile phase was acetone.

As used in the Examples and throughout the application, "eqs" means equivalents; "CA" means cellulose acetate; "CAP" means cellulose acetate propionate; "CAB" means cellulose acetate butyrate; "DOA" means dioctyladipate; "TEC" means triethyl citrate; "GPA" means glucose pentaacetate; "GPP" means glucose pentapropionate; "GPB" means glucose pentabutyrate; "SHP" means sorbitol hexapropionate; "XPP" means xylitol pentapropionate; "PrOH" means propionic acid; "MSA" means methane sulfonic acid; "glu" means glucose; "MD" means machine direction; "TD" means transverse direction; "Tg" means glass transition temperature; "Tc" means crystallization temperature; "Tm" means melting temperature; "MW" means weight average molecular weight.

Example 1

Comparison of Different Base Catalysts for the Preparation of Glucose Esters

Figure 2:
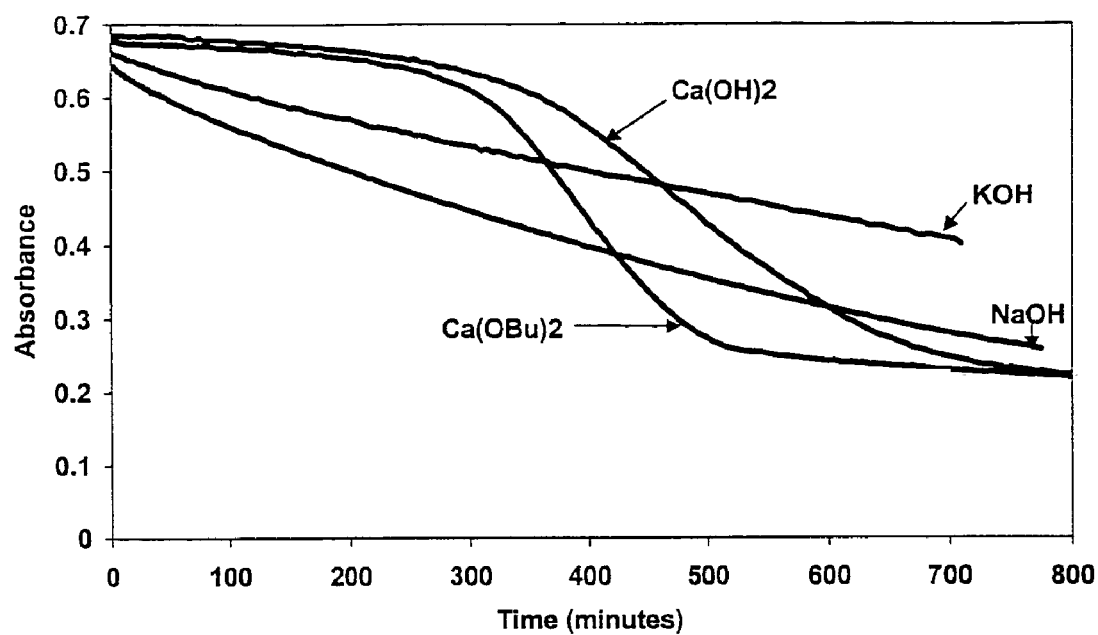
FIG. 2 shows the relative rates of reaction of butyric anhydride with glucose using different catalysts as measured by in situ infrared spectroscopy.

In order to evaluate the relative rates of reaction and the impact on the color of different base catalysts in the esterification of carbohydrates, the reactions of α-D-glucose with butyric anhydride catalyzed by NaOH, KOH, or $Ca(OH)_2$ were studied in situ utilizing mid-infrared attenuated total reflectance spectroscopy. The reactions were conducted in a temperature-controlled (±0.1° C.) 1 L automated reaction system configured with a stirrer, water-cooled condenser and nitrogen purge. The reactant/catalyst amounts were adjusted relative to glucose on a molar basis to result in 6 equivalents anhydride (1.2 hydroxyl equivalents)/1 equivalent glucose/ 0.02 equivalents catalyst. Each reaction was conducted at 90° C. while stirring at 150 rpm. Spectra were collected as the average of 100 scans at 8 wave number resolution and at a rate of one per minute. At the end of the prescribed reaction period, each reaction was washed twice with 700 mL of water. Butyric acid was removed initially in vacuo at 25 mm Hg then at 3 mm Hg. Trace amounts of butyric acid was removed by distillation through a short path column at 1 mm Hg. The results of these experiments are summarized in FIG. 2.

With NaOH as the catalyst, there was not an initial lag period before the esterification began. Relative to KOH, NaOH provided for a faster reaction rate. Although the data are not presented in FIG. 2, the K or Na salts of carboxylic acids behaved in a similar manner. With $Ca(OH)_2$, there was an initial lag period of ca. 3 h before significant reaction was observed. However, once the Ca salt initiated the reaction, the reaction rate, relative to NaOH or KOH, was more rapid. The result was that the $Ca(OH)_2$ catalyzed reaction was completed before the Na or K catalyzed reactions were complete. When a preformed calcium salt of butyric acid was employed as the catalyst, relative to $Ca(OH)_2$, the lag period was shortened and the relative rate of reaction increased. With all three catalysts, the DS of the product was 4.95–5.00 and the β-anomer content ranged from 65–80%. The product made using $Ca(OH)_2$ as the catalyst was nearly colorless (color=6). The products made using NaOH and KOH as the catalysts had color values of 167 and 276, respectively. These observations indicate that Ca salts are more effective catalysts in esterifying carbohydrates and that less color is produced in the product. The initial lag period is likely due to solubility of the Ca salt. The lag period can be shortened by either preforming the Ca salt of the carboxylic acid or by including a small amount of the carboxylic acid (from about 2 to about 30 wt. % carboxylic acid) in the reaction mixture, which will lead to a rapid formation of the Ca salt of the carboxylic acid in situ.

Example 2

Solids Limited Preparation of Glucose Pentapropionate Using MSA as a Catalyst

In a typical procedure, a 12 L 5-neck round bottom flask was equipped with a thermocouple, a reflux condenser, a diamond tipped IR probe for an ASI React IR 4000, a motor driven solids feeder and a mechanical stirrer. Propionic anhydride (6501 g, 50 moles, 1.2 hydroxyl eqs) was added to the flask and the flask was then flushed with $N_2$. The propionic anhydride was heated to the set reaction temperature and 32 g (0.33 moles, 0.04 glucose eqs) of methanesulfonic acid was added. Glucose (1500 g) was fed to the flask at a rate to maintain the desired reaction temperature. If the glucose was fed too rapidly, the reaction exothermed which is noted in Table 1 as the maximum temperature. After all of the glucose had been added (ca. 4 h), the solids feeder was flushed with propionic acid. To reduce the color, 2–3 wt. % of carbon powder was added to the reaction solution. The reaction mixture was concentrated by distillation at 69–73° C. at ca. 50 mm Hg and approximately 30% of the liquids were removed. The reaction mixture was allowed to cool to room temperature before the carbon black was removed by filtration. The filtrate (4 L) was then extracted once with 2 L of water. The layers were separated and the organic layer was distilled, initially at 50 mm Hg dropping to 0.5 mm Hg, to remove water and propionic acid. After distillation, a nonviscous oil was obtained. The reaction product was analyzed by $^1$H NMR and by HPLC. Table 1 provides the analysis of a series of glucose pentapropionates prepared according to this general method.

TABLE 1

Solids limited preparation of glucose pentapropionate using MSA as a catalyst.

| Entry | Set (Maximum) Reaction Temperature (° C.) | Total Reaction Time (h) | MSA (eqs/glu) | % Yield | wt. % PrOH in GPP | DS | α/β | Color |
|---|---|---|---|---|---|---|---|---|
| 1 | 90 (102) | 4.9 | 0.02 | 73 | 0.00 | 5.04 | 51/49 | 40 |
| 2 | 90 (120) | 4.9 | 0.04 | 86 | 1.69 | 4.97 | 67/33 | 334 |
| 3 | 100 (101) | 6.9 | 0.04 | 83 | 0.97 | 5.09 | 65/35 | 89 |
| 4 | 100 (103) | 4.1 | 0.04 | 82 | 0.80 | 5.09 | 61/39 | 105 |
| 5 | 100 (102) | 4.2 | 0.04 | 90 | 0.65 | 5.11 | 59/41 | 210 |

This example reveals that glucose esters such as glucose pentapropionate can be rapidly and easily prepared in high yields using MSA as the catalyst while limiting the glucose to control the reaction exotherm. The best product color i.e., lowest color, was obtained by using low levels of catalyst while maintaining the reaction temperature from about 90–100° C. The most highly colored product was obtained when a higher level of catalyst was used and the reaction temperature was allowed to rise to 120° C. In every example, using MSA as the catalyst preferentially gave the α anomer.

When the initial charge of propionic anhydride had reacted, an additional 2.06 g of Ca(OH)$_2$ (27.8 mmol, glucose 0.01 eqs) was added and 1445 g of propionic anhydride (11.1 moles, 0.8 hydroxyl eqs) was pumped to the reaction vessel. The reaction temperature was maintained at 90° C. for 4.9 h before heating to 105° C. where it was held for an additional 13.7 h. The reaction was then heated to 120° C. and held for 1.3 h. Carbon powder (3 wt. %) was added and the reaction was allowed to cool to room temperature. The carbon powder was removed by filtration and the organic solution was extracted 2 times with an equal volume of water. The layers were separated and the organic layer was distilled to remove propionic acid and water, which gave 1099 g (86%) of a nonviscous oil. Table 2 provides the analysis of two glucose pentapropionates prepared according to this general method.

TABLE 2

Anhydride limited preparation of glucose pentapropionate using Ca(OH)$_2$ as a catalyst.

| Entry | Reaction Temperature (° C.) | Total Reaction Time (h) | Ca(OH)$_2$ (eqs/glu) | % Yield | wt. % PrOH in GPP | DS | α/β | Color |
|---|---|---|---|---|---|---|---|---|
| 6 | 80 (0.5 h), 90 (2.2 h), 100 (1.5 h), 120 (10 h) | 14.2 | 0.13 | 80 | 0.60 | 4.91 | 32/68 | 163 |
| 7 | 90 (4.9 h), 105 (13.7 h), 120 (1.3 h) | 19.9 | 0.2 | 86 | 0.63 | 4.97 | 34/66 | 125 |

The highest ratio of α/β anomer was obtained at higher reaction temperatures or by using a longer reaction times.

Example 3

Anhydride Limited Preparation of Glucose Pentapropionate Using Ca(OH)$_2$ as a Catalyst In a typical procedure, a 5 L 4-neck round bottom flask was equipped with a thermocouple, a reflux condenser, a diamond tipped IR probe for an ASI React IR 4000, a liquid pump feeder and a mechanical stirrer. Propionic anhydride (722 g, 5.55 moles, 0.4 hydroxyl eqs), propionic acid (750 g), α-D-glucose (500 g, 2.78 moles) and 2.06 g of Ca(OH)$_2$ (27.8 mmol, 0.01 glucose eqs) were added to the flask and the flask was then flushed with N$_2$. The reaction mixture was heated to 90° C. and the consumption of propionic anhydride and production of propionic acid was monitored by IR.

This example reveals that glucose esters such as glucose pentapropionate can be rapidly and easily prepared in high yields using Ca(OH)$_2$ as the catalyst while limiting the anhydride to control the reaction exotherm. The best product color was obtained by minimizing the time that the reaction temperature was maintained at about 120° C. In contrast to MSA catalyzed reactions, which gives predominately α-anomer, Ca(OH)$_2$ catalyzed reaction provided 66–68% β-anomer. The low color of the β-glucose pentapropionate prepared by this method was suitable for use as a plasticizer.

Example 4

Anhydride Limited Preparation of Glucose Pentapropionate Using Ca(OH)$_2$ and MSA as the Catalysts A 5 L 4-neck round bottom flask was equipped with a thermocouple, a reflux condenser, a diamond tipped IR probe for an ASI React IR 4000, a liquid pump feeder and a mechanical stirrer. Propionic anhydride (722 g, 50 moles, and 0.4 hydroxyl eqs), propionic acid (206 g), α-D-glucose (500 g, 2.78 moles) and 2.06 g of Ca(OH)$_2$ (27.8 mmol, 0.01 glucose eqs) were added to the flask and the flask was then flushed with N$_2$. The reaction mixture was heated to 90° C. and the consumption of propionic anhydride and production of propionic acid was monitored by IR. When the initial charge of propionic anhydride had reacted (40 min), an additional 1085 g of propionic anhydride (8.3 moles, 0.6 hydroxyl eqs) was pumped to the reaction vessel in 57 min. Following the completion of the addition of the propionic anhydride (1.9 h), 365 g (2.78 moles, 0.2 hydroxyl eqs) of propionic anhydride containing 5.8 g (0.06 moles, 0.02 glucose eqs) of MSA was pumped to the reaction mixture over a period of 72 min. The reaction temperature was maintained at 90° C. for 3.4 h after beginning the addition of the anhydride/MSA solution. Carbon powder (86 g) was added and the reaction was allowed to cool to room temperature (5.3 h total reaction time). The carbon powder was removed by filtration and the solution was extracted 2 times with an equal volume of water. The organic layer was distilled to remove propionic acid and water, which gave 1160 g (91%) of a nonviscous oil. Table 3 provides the analysis of two glucose pentapropionates prepared according to this general method.

TABLE 3

Anhydride limited preparation of glucose pentapropionate using Ca(OH)$_2$ and MSA as the catalysts.

| Entry | Reaction Conditions | Total Reaction Time (h) | Ca(OH)$_2$ + MSA (eqs/glu) | % Yield | wt. % PrOH in GPP | DS | α/β | Color |
|---|---|---|---|---|---|---|---|---|
| 8 | 90° C. (3.7 h, 112° C. maximum temperature, CaOH$_2$), 105° C. (1.1 h, MSA) | 4.8 | 0.01 + 0.02 | 90 | 0.91 | 5.02 | 38/62 | 114 |
| 9 | 90° C. (1.9 h, 107° C. maximum temperature, CaOH$_2$), 90° C. (3.4 h, MSA) | 5.3 | 0.01 + 0.012 | 91 | 0.90 | 5.10 | 36/64 | 20 |

This example reveals that glucose esters such as glucose pentapropionate can be rapidly and easily prepared in high yields using sequentially, Ca(OH)$_2$ and MSA as the catalysts while limiting the anhydride to control the reaction exotherm. When the reaction temperature was maintained at about 90° C., the reaction was completed in 5.3 h and the reaction product was essentially colorless. Even with shorter reaction times, higher temperatures led to the development of more color. Surprisingly, although the last part of the reaction was conducted using MSA as the catalyst which generally provides the α anomer (ca. 59–67%), the product was observed to have a high β anomer (62–64%) content similar to that obtained using only Ca(OH)$_2$ as the catalyst (66–68%). However, the mixed catalyst system allows for a more rapid reaction (ca. 5 h versus 14–20 h for Ca(OH)$_2$ only) with less color in the final reaction product. The color of the glucose pentapropionate produced by this method is low so that the β-GPP is suitable for use as a plasticizer.

Example 5

Anhydride Limited Preparation of Glucose Pentaacetate Using Ca(OH)$_2$ as a Catalyst A 12 L 4-neck round bottom flask was equipped with a thermocouple, a reflux condenser, a diamond tipped IR probe for an ASI React IR 4000, a liquid pump feeder and a mechanical stirrer. Acetic anhydride (1700 g, 16.7 moles, 0.4 hydroxyl eqs), acetic acid (1825 g), α-D-glucose (1500 g, 8.33 moles) and 2.04 g of Ca(OH)$_2$ (27.5 mmol, 0.003 glucose eqs) were added to the flask and the flask was then flushed with N$_2$. The reaction mixture was heated to 80° C. and the consumption of acetic anhydride and production of acetic acid was monitored by IR. When the initial charge of acetic anhydride had reacted (1.2 h), 850 g (8.3 mole, 0.2 hydroxyl eqs) of acetic anhydride was pumped to the reaction vessel in 58 min. After 2.6 h at 80° C., the reaction temperature set point was increased to 90° C. at which point the reaction mixture became a homogeneous, pale yellow solution. After 28 min at 90° C., an additional 6 g of Ca(OH)$_2$ (0.08 mole, 0.01 glucose eqs) was added to the reaction mixture. The reaction temperature was maintained at 90° C. until all of the Ca(OH)$_2$ dissolved. Three hours 40 min after the beginning of the reaction, 2250 g (25 moles, 0.6 hydroxyl eqs) of acetic anhydride was pumped to the reaction vessel over a period of 1.7 h. The reaction was held at 90° C. for a total of 18.8 h before heating to 120° C. where it was held for an additional 5.3 h. Carbon powder (169 g) was added and the reaction was allowed to cool to room temperature. The carbon powder was removed by filtration and the light yellow solution was poured into 2 volumes of water. A fine white precipitate formed immediately and 1 volume of water was added to harden the precipitate. The white powder was isolated by filtration and washed with water until the filtrate pH was 7. The white solids were dried under reduced pressure at ca. 60° C. which provided 2503 g (77%) of a white powder. Proton NMR revealed that the product was glucose pentaacetate with a DS of 5.06 with an α/β ratio of 28/72.

This example reveals that glucose pentaacetate with excellent color can be safely prepared in high yield using Ca(OH)$_2$ as the catalyst when limiting the amount of anhydride supplied to the reaction. The glucose pentaacetate was of sufficient quality to be used as a plasticizer.

Example 6

Figure 3:
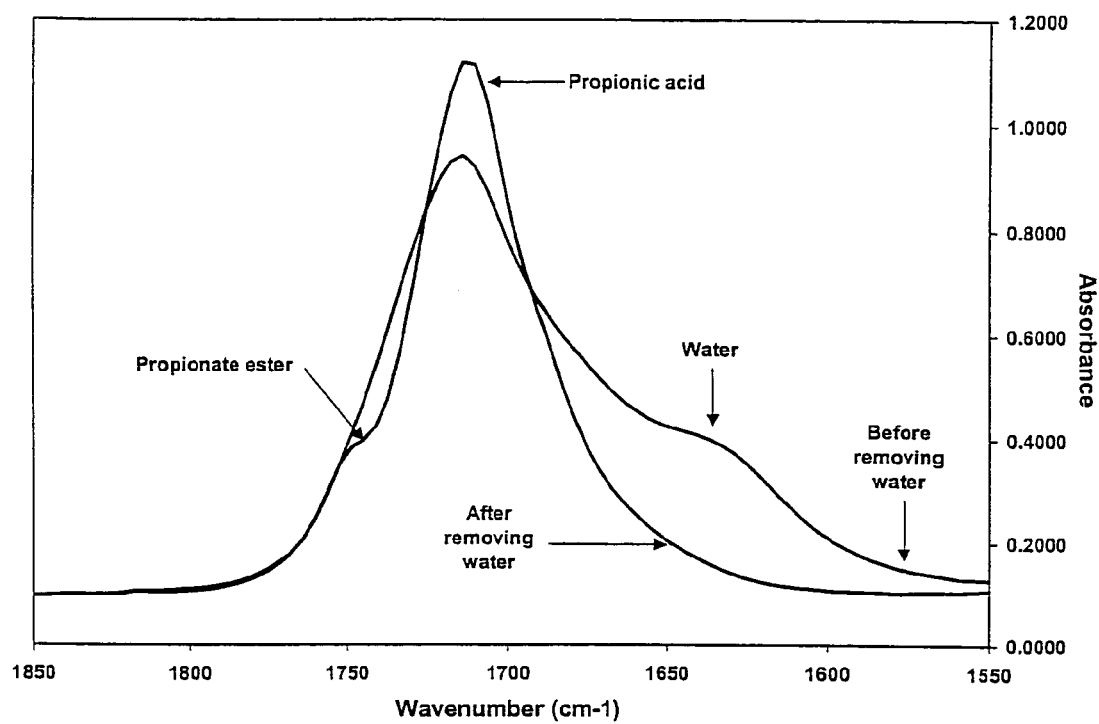
FIG. 3 shows the water bands, and the carbonyl bands for propionic acid and the carbonyl bands for the propionate ester of glucose. The infrared spectra were collected in situ before the removal of water and after the removal of water from an aqueous/propionic acid glucose solution.

Preparation of Glucose Pentapropionate by Dehydration Using Ca(OH)$_2$ as the Catalyst A 5 L 5-neck round bottom flask was equipped with a thermocouple, a short path column, a diamond-tipped IR probe for an ASI React IR 4000, a liquid pump feeder and a mechanical stirrer. Glucose (721 g) and water (308 g) was added to the flask and the mixture was stirred at 60–70° C. until a solution was obtained. To this solution was added 1271 g of propionic acid and 1.48 g of Ca(OH)$_2$ (0.02 moles, 0.005 glucose eqs), which resulted in an opaque, heterogeneous mixture. The flask was heated at 60° C. and a vacuum (60–100 mm Hg) was applied so that the flask and head temperature was maintained between 50–60° C. After 90 minutes, 908 g of distillate had been removed and the reaction mixture was a suspension of solids in liquids. Analysis by in situ IR indicated that essentially all of the water had been removed and that the glucose was partially esterified (FIG. 3). Gradual addition of propionic anhydride was initiated while heating the flask to 90° C. and adjusting vacuum to 120 mm Hg. After reaching 90° C./120 mm Hg, propionic acid was removed as propionic anhydride was added. Approximately 250 min were required to add 2610 g (1 hydroxyl eqs) of propionic anhydride and during this time, 758 g of distillate was removed. Approximately 60 min after completion of the anhydride addition, 4.96 g of MSA (0.003 glucose eqs) was added to the reaction mixture. Approximately 200 min after adding the MSA, all of the anhydride had been consumed. To insure completeness of reaction, an additional 201 g (1.5 moles, 0.08 hydroxyl eqs) of propionic anhydride was added to the reaction mixture along with 47 g of carbon powder. No additional reaction was observed. Propionic acid was removed from the reaction mixture by distillation at 85° C. and 100 mm Hg. After removing 1061 g of propionic acid, 0.48 g of Ca(OH)$_2$ was added to the reaction mixture before filtering to remove the carbon powder. The filtrate was washed with 0.5 volumes of water and the layers were separated. Propionic acid and water were removed from the organic layer by distillation, which provided 1685 g (91.6%) of β-glucose pentapropionate (DS=4.79) as a nonviscous oil. The β-GPP had low color (57) and was suitable for use as a plasticizer.

Example 7

Solids Limited Preparation of Sorbitol Hexapropionate Using MSA as the Catalyst

A 12 L 5-neck round bottom flask was equipped with a thermocouple, a reflux condenser, a motor driven solids feeder and a mechanical stirrer. Propionic anhydride (7501 g, 57.6 moles, 1.16 hydroxyl eqs) and MSA (31.7 g, 0.329 mol, 0.04 sorbitol eqs) were added to the flask and the flask was then flushed with N$_2$. The solution was heated to 90° C. before undried sorbitol (1500 g, 8.23 mol) was fed to the flask at a rate to maintain the reaction temperature at 90–97° C. After all of the sorbitol had been added (4.3 h), the solids feeder was flushed with 381 g propionic anhydride. The reaction was maintained at 90° C. for an additional 1 h before 75 g of carbon powder was added. An additional 900 g of propionic anhydride was added to the reaction mixture and the reaction was heated to 100° C. where it was maintained for an additional 1.8 h. The reaction mixture was concentrated by distillation at 80° C. at ca. 150 mm Hg and approximately 50% of the liquids were removed. The carbon black was removed by filtration. The filtrate was extracted once with 0.5 volumes of water. The layers were separated and the organic layer was distilled at 1 mm Hg to remove water and propionic acid. After distillation, 3826 g (90%) of a liquid with a viscosity of 2.4 poise at 25° C. was obtained. Analysis by $^1$H NMR and by HPLC indicated that the sample had a DS of 5.27 and that it contained 0.49 wt. % propionic acid. The product had a color of 15 and was suitable for use as a plasticizer.

This example demonstrates polyol ester plasticizers can be easily prepared by the methods of this invention.

Example 8

Figure 4:
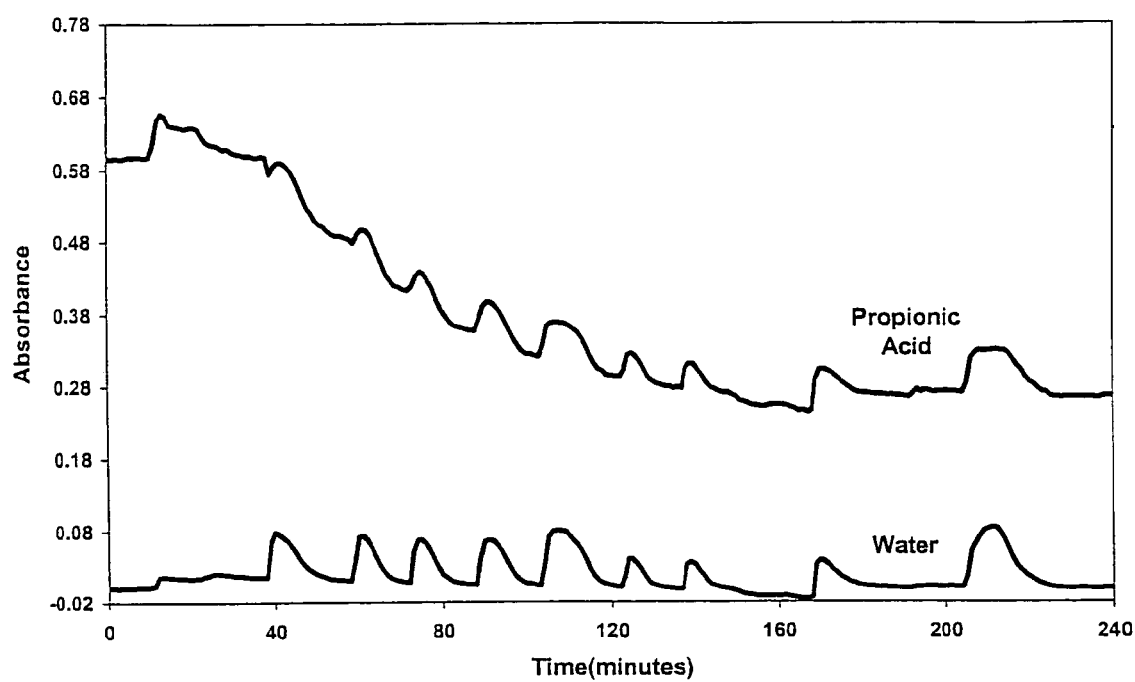
FIG. 4 shows the addition of water and the azeotropic distillation of water and propionic acid from GPP as measured by in situ infrared spectroscopy.
Figure 5:
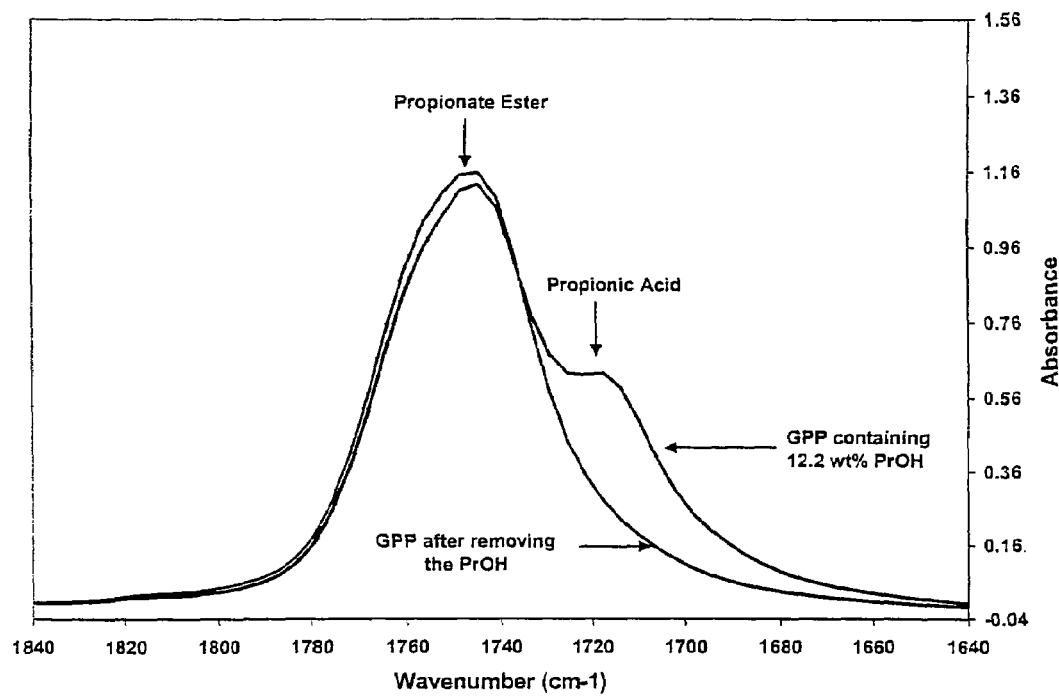
FIG. 5 shows the carbonyl bands for propionic acid and for the propionate ester of glucose. The infrared spectra were collected in situ before beginning an azeotropic distillation and after completion of the distillation.

Azeotropic Distillation to Remove Residual Propionic Acid from Glucose Pentapropionate A 1 L 4-neck round bottom flask was equipped with a thermocouple, a short path column, a diamond tipped IR probe for an ASI React IR 4000, a liquid pump feeder and a mechanical stirrer. To the flask was added 331.4 g of GPP (DS=5.04, α/β=51/49) containing no propionic acid. To the GPP was added 46 g of propionic acid (12.2 wt. %). The flask was heated to 50° C. and a vacuum of approximately 55 mm Hg was applied. Water was added to the solution 9 times in increments of about 6–33 mL until a total of 179 g of water was added over a period of about 2.6 h. With each addition of water, the solution temperature was observed to drop and a propionic acid/water distillate was removed at a head temperature of about 27–37° C. As the azeotrope was removed, the flask temperature gradually warmed. After the 8$^{th}$ addition, the flask temperature set point was increased to 70° C. After the final water addition, the solution temperature was allowed to rise to about 62° C. before the experiment was terminated. FIG. 4 shows the addition of water and the removal propionic acid/water over the course of the experiment. FIG. 5 shows the carbonyl and the water bands in IR region from about 1640–1840 cm$^{-1}$ for the initial sample, the sample after addition of propionic sample acid and for a the sample containing 0.5 wt. % after removing the propionic acid. After the experiment was completed, the DS, α/β ratio and color of the sample were found to be unchanged and the propionic acid content was 0.34 wt. %.

This example illustrates that residual carboxylic acid can be removed from a carbohydrate or polyol ester under very mild conditions with a water azeotrope without altering the sample.

Example 9

Thermal Compounding of Cellulose Acetate with Glucose Esters and Melt Compression to Form Films Mixtures of cellulose acetate (DS=2.5) and 8 or 16 wt. % glucose ester plasticizers were prepared by shaking the components together in a plastic bag. As a control, mixtures of cellulose acetate and triethyl citrate, which is a known plasticizer for the cellulose acetate, were also prepared at the same concentrations. Each mixture was compounded at 220° C. in a Rheometrics Mechanical Spectrometer. The resulting resin was ground to 3 mm particle size and films were prepared by compression molding at 230–250° C. The optical clarity of the films and the glass transition temperatures, which are a measure of CA/plasticizer miscibility, were determined. Film properties were also determined for each composition. The results are summarized in Table 4. In Table 4, the α- or β-anomer content of the glucose plasticizer is indicated within the parenthesis.

TABLE 4

Physical and thermal properties of film prepared from cellulose acetate and glucose esters.

| Entry | Plasticizer Content | Break Stress (MPa) | Break Strain % | Young's Modulus (MPa) | Tg °C. |
|---|---|---|---|---|---|
| 10 (comparative) | 8 wt. % TEC | 61 | 10 | 1959 | 160 |
| 11 (comparative) | 16 wt. % TEC | 49 | 11 | 1890 | 138 |
| 12 | 8 wt. % α(87)-GPA | 78 | 9 | 2377 | 164 |
| 13 | 16 wt. % α(87)-GPA | 72 | 5 | 2404 | 142 |
| 14 | 8 wt. % β(94)-GPA | 84 | 8 | 2438 | 162 |
| 15 | 16 wt. % β(94)-GPA | 75 | 4 | 2585 | 142 |
| 16 | 8 wt. % α(80)-GPP | 74 | 10 | 2103 | 165 |
| 17 | 16 wt. % α(80)-GPP | 65 | 6 | 2197 | 146 |
| 18 | 8 wt. % β(77)-GPP | 62 | 8 | 2168 | 160 |
| 19 | 16 wt. % β(77)-GPP | 54 | 5 | 1952 | 142 |
| 20 | 8 wt. % α(91)-GPB | 68 | 9 | 1925 | 166 |
| 21 | 16 wt. % α(91)-GPB | 70 | 10 | 1711 | 166 |
| 22 | 8 wt. % β(76)-GPB | 73 | 10 | 1977 | 167 |
| 23 | 16 wt. % β(76)-GPB | 70 | 9 | 1895 | 133 |

As expected, films prepared from CA with TEC as the plasticizer were optically clear, stable and the Tg of the formulations were depressed relative to that of the parent CA (Tg=189° C.). This indicates that the plasticizer is miscible with the CA. Likewise, films prepared with CA/α- or β-GPA formulations were optically clear, the films were stable and the Tgs were composition dependent. No difference was observed between the ability of the α- or β-GPA to depress the Tg. The film properties of the formulations with either of the GPA anomers were essentially the same at equal concentration. The break stress and the modulus for the films containing GPA were higher that those containing TEC as the plasticizer. In the case of CA formulations with α-GPP, freshly prepared films were optically clear at both concentrations but the film containing 16 wt. % α-GPP became opaque over a period of ca. 8 months. With CA/β-GPP, the films were clear and remained so even after prolonged storage at ambient temperature and at 60° C. β-glucose pentapropionate was more efficient in depressing the Tg of the formulations. In terms of film properties, β-GPP was more effective in lowering the break stress and the modulus than α-GPP and the observed values with β-GPP were, within experimental error, the same as that obtained with TEC. In the case of CA/α-GPB, film containing 8 wt. % α-GPB was optically clear and was stable. Film containing 16 wt. % α-GPB became immediately opaque and the Tg was not composition dependent. With the CA/β-GPB formulations, the films were optically clear and the Tg was composition dependent. However, the film containing 16 wt. % β-GPB did become cloudy after storage for several weeks.

Collectively, these observations indicate that both α- and β-GPA have very good miscibility with cellulose acetate. Because the melt viscosity and the Tg is composition dependent while the film properties are only marginally influenced by composition, both anomers of GPA are best described as bimodal plasticizers. Very surprisingly, relative to the α anomer, β-GPP acts more as a classical plasticizer by more effectively depressing the Tg. That is, the anomeric configuration can significantly influence the plasticizer miscibility with CA, which is previously unknown in the art. In the case of GPB, the longer ester chain diminishes the miscibility of both anomers with CA but, as observed with GPP, the β-anomer has higher compatibility with the CA.

Example 10

Thermal Compounding of Cellulose Acetate Propionate with Glucose Esters and Melt Compression to Form Films Mixtures of cellulose acetate propionate ($DS_{Pr}$=2.68, $DS_{Ac}$=0.05) and 8 or 16 wt. % glucose ester plasticizers were prepared by shaking the components together in a plastic bag. As a control, mixtures of cellulose acetate propionate and dioctyl adipate, which is a know plasticizer for cellulose acetate propionate, were also prepared at the same concentrations. Each mixture was compounded at 180–220° C. in a Rheometrics Mechanical Spectrometer. The resulting resin was ground to 3 mm particle size and films were prepared by compression molding at 200–220° C. The optical clarity of the film and the glass transition temperatures, which are measure of CAP/plasticizer miscibility, were determined. Film properties were also determined for each composition. The results are summarized in Table 5. In Table 5, the α- or β-anomer content of the glucose plasticizer is indicated within the parenthesis.

TABLE 5

Physical and thermal properties of film prepared from cellulose acetate propionate and glucose esters.

| Entry | Plasticizer Content | Break Stress (MPa) | Break Strain % | Young's Modulus (MPa) | DSC ° C. |
|---|---|---|---|---|---|
| 24 (comparative) | 8 wt. % DOA | 32 | 30 | 1081 | 112 |
| 25 (comparative) | 16 wt. % DOA | 16 | 23 | 614 | 101 |
| 26 | 8 wt. % α(87)-GPA | 48 | 10 | 1688 | 114 |
| 27 | 16 wt. % α(87)-GPA | 36 | 14 | 1556 | 94 |
| 28 | 8 wt. % β(94)-GPA | 40 | 12 | 1493 | 119 |
| 29 | 16 wt. % β(94)-GPA | 33 | 7 | 1329 | 101 |
| 30 | 8 wt. % α(80)-GPP | 47 | 7 | 1548 | 121 |
| 31 | 16 wt. % α(80)-GPP | 43 | 13 | 1596 | 102 |
| 32 | 8 wt. % β(77)-GPP | 38 | 8 | 1384 | 115 |
| 33 | 16 wt. % β(77)-GPP | 28 | 7 | 1244 | 99 |
| 34 | 8 wt. % α(91)-GPB | 41 | 10 | 1416 | 119 |
| 35 | 16 wt. % α(91)-GPB | 37 | 26 | 1254 | 102 |
| 36 | 8 wt. % β(76)-GPB | 43 | 7 | 1368 | 118 |
| 37 | 16 wt. % β(76)-GPB | 37 | 18 | 1270 | 101 |

Films prepared from CAP with DOA as the plasticizer were optically clear, stable and the Tg of the formulations were depressed relative to that of the parent CAP (Tg=141° C.). This indicates that the plasticizer is miscible with the CAP. Films prepared with the CAP/α- or β-GPA formulations were optically clear, stable and the Tg was composition dependent. The break stress and the modulus for CAP/β-GPA formulations were lower than the corresponding CAP/α-GPA formulations. In terms of lowering these values, this indicates that β-GPA is a more effective plasticizer for CAP than α-GPA at equal concentrations. The films prepared with CAP/α- or β-GPP behaved very similar to the GPA formulations. Films prepared from CAP/α- or β-GPP formulations were optically clear, stable and the Tg was composition dependent. The break stress and the modulus for CAP/β-GPP formulations were lower than the corresponding CAP/α-GPP formulations. Again, these observations indicate that β-GPP is a more effective plasticizer for CAP than α-GPP at equal concentrations. Relative to β-GPA, β-GPP is a more effective plasticizer for CAP. In the case of CAP/α- or β-GPB formulations, the films were optically clear, stable and the Tg was composition dependent. In terms of film properties, a significant difference was not observed between α- or β-GPB in their ability to plasticize CAP.

These observations indicate that all of these glucose esters have good compatibility with the cellulose acetate propionate. However, in the case of GPA and GPP, the β anomer more effectively lowers the modulus and break stress indicating that the β anomer is a more effective plasticizer than the α anomer.

Example 11

Solvent Casting of Cellulose Triacetate Film Plasticized with Carbohydrate or Polyol Esters Cellulose triacetate films plasticized with 16 or 24 wt. % β-GPA, β-GPP, SHP, or XPP were prepared by solvent casting. In the case of β-GPA and β-GPP, the CTA and the glucose esters were dissolved in 90/10 $CH_2Cl_2$/MeOH at 15 wt. % solids. The solution was poured onto a glass plate and a draw down knife was used to cast a uniform film. The solvent was allowed to evaporate which gave films with an average thickness of about 0.03–0.04 mm. Due to higher solution viscosity, 10 wt. % solids were used to cast the CTA/SHP, XPP films. Comparative examples of control films of CTA with no plasticizer (15 wt. % solids) and CTA plasticized with 13 wt. % TPP (10 wt. % solids) were also prepared using the same technique.

In every case, optically clear films were obtained. The films containing no plasticizer curled from the plate while the plasticized samples remained flat. Each of the samples were analyzed by DSC, which indicated that the plasticizers were compatible with CTA. As an example, unplasticized CTA gave a Tc on the $1^{st}$ scan of 215° C. and a $2^{nd}$ scan Tg of 184° C.; a melt was not observed as the Tm is at or above the decomposition temperature. In the case of CTA plasticized with 16 wt. % β-GPP, the observed $1^{st}$ scan Tc was 171° C. and the $2^{nd}$ scan Tg and Tm were 96 and 279° C. With 24 wt. % β-GPP, the observed $1^{st}$ scan Tc was 161° C. and the $2^{nd}$ scan Tg and Tm were 84 and 270° C.

These results indicate that these carbohydrate or polyol esters plasticizers are compatible with CTA and that they can be used to prepare optically clear thin films.

Example 12

Melt Extrusion of Cellulose Acetate Film

Cellulose acetate pellets (DS=2.5) plasticized with either DEP (comparative), β-GPA, or β-GPP were dried overnight at 60° C. Thin film (0.06 mm) was prepared by melt extrusion using a 1.5 inch Killion. With the CA/DEP formulation the melt temperature was 230° C. and the die temperature was 237° C. With β-GPA, the melt and die temperatures were 247 and 260° C., respectively. With β-GPP, the melt and die temperatures were 237 and 250° C., respectively. Film properties were determined and those values are provided in Table 6. The film prepared from the CA/β-GPP formulation was essentially the same as the film prepared from the CA/DEP control formulation. Relative to the control film, film prepared from the CA/β-GPA formulation exhibited a higher break stress, modulus and tear strength. All of the formulations were optically clear and had low color.

This example shows that thin films comprising the plasticizers of the present invention can be prepared by melt extrusion. The films have low color and are optically clear. By selection of the proper carbohydrate ester plasticizer and plasticizer content, a range of physical properties is available. Relative to the comparative formulation, β-GPA gives a stronger and stiffer film. In contrast, when β-GPP is used as the plasticizer, the film properties are very close to those obtained from film containing the prior art DEP plasticizer.

Example 13

Melt Viscosities of Cellulose Acetate Propionate Plasticized with Carbohydrate or Polyol Ester Plasticizers Mixtures of cellulose esters and carbohydrate or polyol ester plasticizers were prepared by compounding on a 30 mm Werner-Pfleider twin screw extruder. In a typical procedure, separate feed systems were utilized for the cellulose ester and for the plasticizer. The cellulose ester was added as a dry powder in Zone 1 and the plasticizer was added as a liquid in Zones 2 or 3. The cellulose ester was added at the desired rate, typically about 9–23 Kg/h, from a hopper into the barrel of the extruder. The plasticizer was pumped from a liquid feeder into the barrel of the extruder. If it was necessary to reduce the plasticizer viscosity, the plasticizer was preheated prior to pumping to the extruder. The temperatures of the individual zones depend upon the type of cellulose ester and plasticizer. Typically, the zones varied from about 100 to about 250° C. Afterward, the two strands of material exiting the extruder were quenched in water and chopped into pellets.

Using this general method, mixtures of cellulose acetate propionate and β-glucose pentapropionate, xylitol pentap-ropionate and sorbitol hexapropionate ("SHP") were prepared at different wt. % plasticizer. The absolute molecular weight and the melt viscosities at three temperatures of each composition were determined. The melt viscosities were then normalized to an absolute molecular weight of 110,000. The glass transition temperature for each formulation was also determined. The results are summarized in Table 7.

TABLE 6

Film properties for melt extruded film prepared from cellulose acetate plasticized with β-GPA or β-GPP.

| Entry | Break Stress MD (MPa) | Break Stress TD (MPa) | Break Strain MD (%) | Break Strain TD (%) | Young's Modulus MD (MPa) | Young's Modulus MD (MPa) | Tear MD (g/mm) | Tear MD (g/mm) |
|---|---|---|---|---|---|---|---|---|
| 38 (18% DEP) (comparative) | 65 | 37 | 47 | 33 | 2006 | 1457 | 156 | 196 |
| 39 (15% β-GPA) | 81 | 82 | 10 | 4 | 3359 | 2933 | 267 | 234 |
| 40 (18% β-GPP) | 54 | 54 | 29 | 7 | 1862 | 2233 | 169 | 221 |

TABLE 7

Normalized melt viscosities for CAP plasticized with carbohydrate or polyol esters.

| Entry | Wt. % Plasticizer (HPLC) | MW | Normalized Melt Viscosity (100 rad/sec, 200° C.) | Normalized Melt Viscosity (100 rad/sec, 210° C.) | Normalized Melt Viscosity (100 rad/sec, 220° C.) | Tg (° C.) |
|---|---|---|---|---|---|---|
| 41 | 15.3% SHP | 126,715 | 2750 | 1358 | 548 | 92 |
| 42 | 16.8% SHP | 131,211 | 1813 | 538 | 164 | 79 |
| 43 | 18.9% SHP | 128,563 | 838 | 341 | 85 | 57 |
| 44 | 13.7% XPP | 110,062 | 8703 | 6329 | 4465 | 99 |
| 45 | 15.5% XPP | 102,565 | 9053 | 6367 | 4467 | 97 |
| 46 | 16.9% XPP | 101,764 | 6731 | 4578 | 3186 | 84 |

TABLE 7-continued

Normalized melt viscosities for CAP plasticized with carbohydrate or polyol esters.

| Entry | Wt. % Plasticizer (HPLC) | MW | Normalized Melt Viscosity (100 rad/sec, 200° C.) | Normalized Melt Viscosity (100 rad/sec, 210° C.) | Normalized Melt Viscosity (100 rad/sec, 220° C.) | Tg (° C.) |
|---|---|---|---|---|---|---|
| 47 | 21.1% XPP | 107,189 | 3881 | 2631 | 1801 | 75 |
| 48 | 12.9% β-GPP | 116,550 | 9016 | 6370 | 4565 | 105 |
| 49 | 15.2% β-GPP | 120,442 | 5399 | 3800 | 2761 | 97 |
| 50 | 18.0% β-GPP | 119,935 | 4782 | 3480 | 2404 | 92 |
| 51 | 21.5% β-GPP | 125,204 | 2759 | 2041 | 1470 | 90 |

For unplasticized CAP, the melt viscosity at 220° C. is 14,182 poise and the Tg from the $2^{nd}$ heating curve is 141° C. As the data in Table 7 illustrate, each of these plasticizers significantly lowers the melt viscosity of CAP and depresses the Tg. In relative terms, SHP is much more effective in lowering the melt viscosity than either XPP or β-GPP and β-GPP lowers the melt viscosity more than XPP. All of these formulations were optically clear. Collectively, the data show that these carbohydrate and polyol ester plasticizers are miscible with CAP and that they act as good plasticizers.

Example 14

Compounding and Injection Molding of Cellulose Acetate Butyrate Plasticized with Carbohydrate or Polyol Ester Plasticizers Using the general method described in example 13, mixtures of cellulose acetate butyrate and β-glucose pentaacetate, α-glucose pentapropionate and β-glucose pentabutyrate were prepared at different wt. % plasticizer. Tensile and flexural bars were prepared by injection molding using a Toyo 90. The melt temperature was 210° C. and the mold temperature was 30–38° C. The cycle time for the injection molding was 34 sec. The normalized melt viscosities for the formulations and the physical properties determined for these injection molded pieces are given in Table 8.

TABLE 8

Tensile and flexural properties for injection molded pieces prepared from cellulose acetate butyrate plasticized with carbohydrate esters.

| Entry | Wt. % Plasticizer (HPLC) | Tensile Break Stress (MPa) | Tensile Break Strain (%) | Tensile Yield Stress (MPa) | Flexural Modulus (MPa) | Flexural Yield Stress (Mpa) | Normalized Melt Viscosity (100 rad/sec, 210° C.) |
|---|---|---|---|---|---|---|---|
| 52 | 11.9% β-GPA | 49.1 | 7.5 | 59.5 | 2556.7 | 75.5 | 6742 |
| 53 | 13.9% β-GPA | 49.1 | 7.4 | 59.6 | 2448.0 | 72.8 | 5458 |
| 54 | 17.4% β-GPA | 46.7 | 8.9 | 58.6 | 2522.1 | 72.5 | 3677 |
| 55 | 7.2% α-GPP | 47.4 | 8.7 | 56.2 | 2510.3 | 73.1 | 6937 |
| 56 | 9.7% α-GPP | 45.9 | 8.7 | 55.1 | 2374.8 | 70.2 | 5506 |
| 57 | 13.6% α-GPP | 41.5 | 9.4 | 52.0 | 2197.8 | 64.2 | 3641 |
| 58 | 17.1% α-GPP | 37.2 | 19.4 | 46.7 | 1852.6 | 56.1 | 675 |
| 59 | 7.6% β-GPB | 40.7 | 12.2 | 47.7 | 2053.0 | 62.6 | 10448 |
| 60 | 10.7% β-GPB | 37.9 | 16.2 | 45.5 | 1963.3 | 58.6 | 7898 |

All of the formulations shown in Table 8 were optically clear, the glass transition temperature of each formulation was composition dependent and all three plasticizers lowered the melt viscosities of the CAB. These observations indicate that these carbohydrate esters are good plasticizers for CAB. Comparison of the normalized melt viscosities obtained using the three plasticizers indicates that α-GPP is more effective at lowering the melt viscosity of CAB. The tensile and flexural properties for the CAB/β-GPA formulations did not exhibit a composition dependence, which indicates that β-GPA is acting more as a bimodal plasticizer. In contrast, the tensile and flexural properties for the CAB/α-GPP or β-GPB formulations were composition dependent in that the tensile and flexural values decreased with increasing plasticizer. Collectively, the data show that these carbohydrate esters are miscible with CAP and that they act as plasticizers for the CAB. A wide range of melt viscosities and physical properties are available by selection of the appropriate concentration of a chosen carbohydrates ester plasticizer.

Example 15

Compounding and Injection Molding of Cellulose Acetate Propionate/Carbohydrate Ester Plasticizer Formulations with High Heat Deflection Temperatures Using the general method described in example 13, mixtures of cellulose acetate propionate ($DS_{Ac}$=1.95, $DS_{Pr}$=0.66) and β-glucose pentaacetate, α-glucose pentap- C. The cycle time for the injection molding was 34 sec. The normalized melt viscosities for the formulations and the heat deflection temperatures determined for these injection molded pieces are given in Table 9.

TABLE 9

Normalized melt viscosities and heat deflection temperatures for cellulose acetate propionate plasticized with carbohydrate esters.

| Entry | Wt. % Plasticizer | Normalized Melt Viscosity (100 rad/sec, 240° C.) | HDT (° C., 66 psi) | HDT (° C., 264 psi) |
|---|---|---|---|---|
| 61 | 5.7% β-GPB | 20502 | 121 | 98 |
| 62 | 6.3% β-GPB | 15664 | 113 | 90 |
| 63 | 11.1% β-GPA | 11,595 | 101 | 77 |
| 64 | 13.0% β-GPA | 9807 | 96 | 73 |
| 65 | 15.5% β-GPP | 7235 | 88 | 65 |

All of the formulations shown in Table 9 were optically clear and the glass transition temperature of each formulation was composition dependent. The melt viscosity of unplasticized CAP at 240° C. was 25,572 poise. All three plasticizers lowered the melt viscosity of the CAP even at low level of plasticizer. The HDT for unplasticized CAP is 131° C. Addition of relatively low amounts of carbohydrate ester plasticizer significantly lowered the melt viscosity, which allows easier melt processing, but had minimal effect on the HDT. These observations indicate that carbohydrate or polyol ester plasticizers can be used in combination with cellulose esters such as CAP or CA to obtain objects with high heat deflection temperatures.

Example 16

A 5 L 5-neck round bottom flask was equipped with a thermocouple, a reflux condenser with a short path distillation column at the head of the condenser, a diamond tipped IR probe for an ASI React IR 4000, a liquid feeder (needle valve) and a mechanical stirrer. Glucose monohydrate (750 g), 175 g of propionic acid, 1084 g of propionic anhydride and 0.62 g of Ca(OH)$_2$ were added to the flask. The flask was heated to 55° C. and a vacuum (30 mm Hg) was applied. A water/propionic acid azeotrope was removed by distillation at a rate faster than the consumption of anhydride by water. A total of 70 g of distillate was removed. In situ IR indicated that ca. 50–75 g of propionic anhydride was consumed by water. When a distillate could no longer be removed at 55° C., 30 mm Hg, the reaction mixture was heated to 90° C. and the vacuum was adjusted to 60 mm Hg so that propionic acid was being removed. The glucose was well dispersed in the liquid and no clumping was observed. The remaining anhydride (2214 g) was then pumped to the flask at a rate of ca. 40 g/min. When all of the anhydride was added, the chill water to the condenser was turned on and the temperature controller was set to turn off in 12 h.

The faint yellow solution was heated to 85° C. and 1.97 g of MSA acid was added to the reaction mixture. The pot temperature was increased to 90° C. and maintained at that temperature for 45 min before adding 0.18 g of Ca(OH)$_2$. To the faint yellow solution was added 30 g of carbon powder and propionic acid was removed at 80° C., 10 mm Hg. At the end of the distillation, ca. 4.2 wt. % acid remained in the solution. Both IR and proton NMR showed that the reaction product was glucose propionate.

This Example shows that a hydrated glucose material can be used to prepare a carbohydrate ester according to the present invention.

Example 17 (Including Comparative Samples)

Compounding and Injection Molding of Cellulose Acetate Propionate Plasticized with Polyol Ester Plasticizers Using the general method described in example 13, binary mixtures of cellulose acetate propionate ($DS_{Pr}$=2.67, $DS_{Ac}$=0.06) with xylitol pentapropionate, xylitol pentaacetate (comparative) and dioctyl adipate (comparative) were prepared at different wt. % plasticizer. Dioctyl adipate is a known plasticizer for CAP. Tensile and flexural bars were prepared by injection molding using a Toyo 90 following the procedure of example 14. The physical properties determined for these injection molded pieces were determined and the results are summarized in FIGS. 6–9.

All of the formulations prepared in this example were optically clear, the glass transition temperature of each formulation was composition dependent and all of the plasticizers lowered the melt viscosities of the CAP. These observations indicate that these carbohydrate esters are plasticizers for CAP. However, as FIGS. 6–9 illustrate, the physical properties of molded objects prepared from the formulations are substantially different. For example, from FIG. 6 it can be seen that with the known DOA plasticizer, the break stress decreases linearly with increasing DOA content. The break stress for the XPP formulations decreased in a similar manner to the DOA formulations with the exception that slightly more plasticizer was required to achieve the same break stress.

Figure 6:
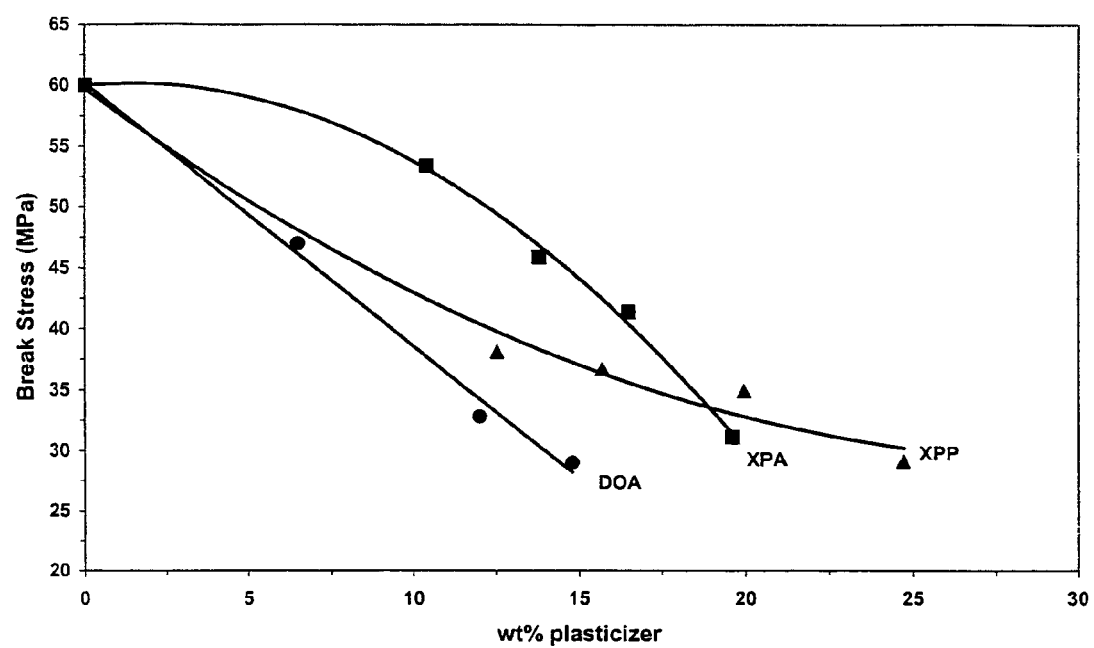
FIG. 6 shows the break stress of CAP plasticized with polyol esters of the present invention and with prior art plasticizers as comparative examples.

To illustrate, the data shown in FIG. 6 indicate that 9.5 wt. % DOA is required to achieve a break stress of 40 MPa while 12.5 wt. % XPP is required to obtain the same break stress. The XPA formulation was substantially different from the DOA or XPP formulations. At lower concentrations of plasticizer (<10 wt. %), both DOA and XPP depressed the break stress while the break stress for the XPA formulation was hardly changed from that of the unplasticized CAP.

Figure 7:
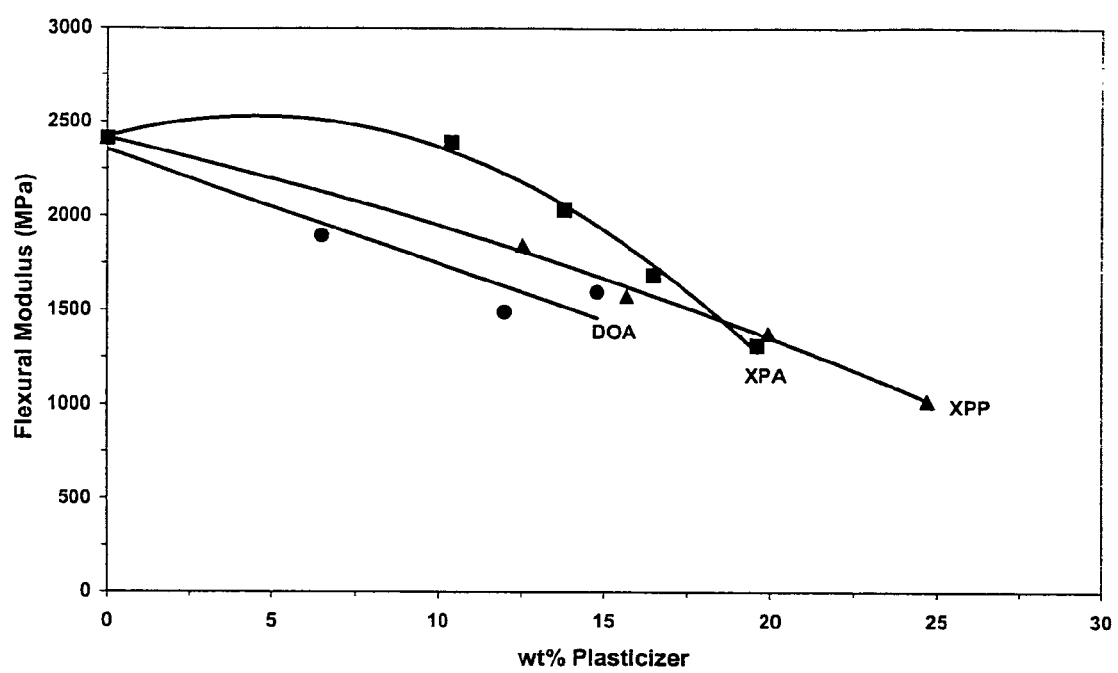
FIG. 7 shows the flexural modulus of CAP plasticized with the polyol esters of the present invention and with prior art plasticizers as comparative examples.
Figure 8:
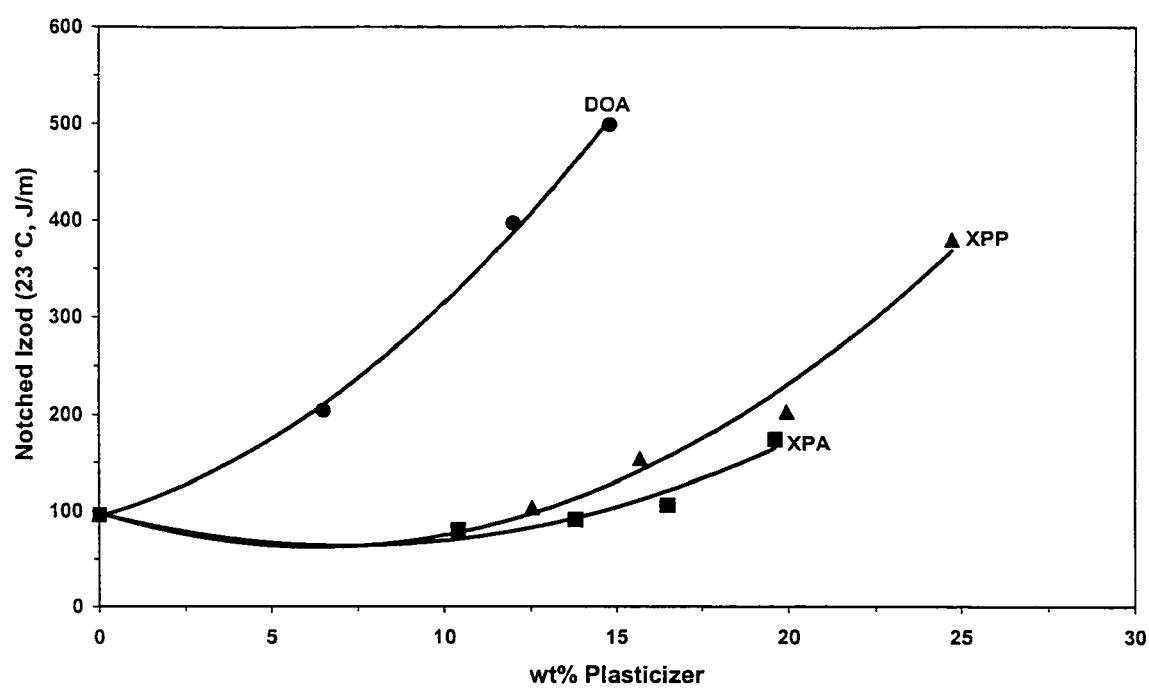
FIG. 8 shows the notched Izod impact strength for CAP plasticized with the polyol esters of the present invention and with prior art plasticizers as comparative examples.

The impact of plasticizer type and content of plasticizer is further illustrated in FIG. 7, which shows the change in flexural modulus with increasing plasticizer content. As can be seen, with the DOA and XPP formulations, the flexural modulus decreases in linear manner with increasing plasticizer content. As with the break stress, slightly more XPP than DOA is required to achieve the same flexural modulus. When the plasticizer is XPA, ca. 12–15 wt. % plasticizer is required before the flexural modulus is even depressed below that of the unplasticized CAP. The data in FIG. 7 indicates that the XPA formulations would only provide values of flexural modulus that are comparable to the XPP and DOA formulations when the XPA was present at very high content in the formulations (20 wt. %>).

A physical property critical in many applications is the notched Izod impact strength. It is generally desirable to have formulations that provide high-notched impact strengths as FIG. 8 demonstrates, at a given content of plasticizer in the CAP formulations; DOA provides the highest notched Izod impact strength. Although the XPP formulations do not provide notched Izod impact strengths equivalent to the DOA formulations, the impact strengths of the XPP formulations are significantly better than the XPA formulation. The impact strengths of the XPP formulations are acceptable for most applications.

Figure 9:
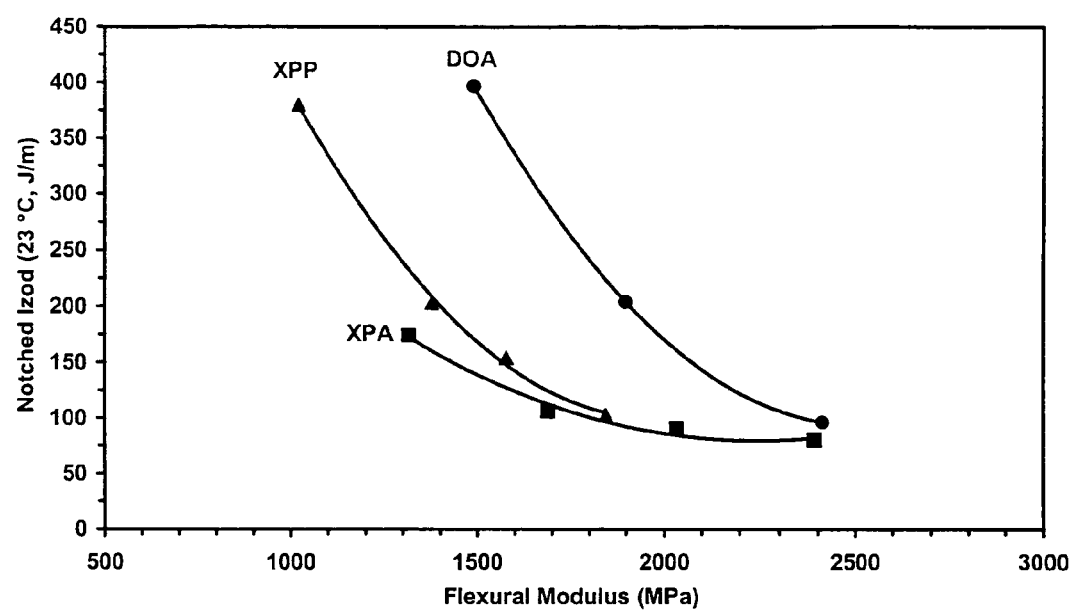
FIG. 9 shows the flexural modulus versus notched Izod impact strength for CAP plasticized with the polyol esters of the present invention and with prior art plasticizers as comparative examples.

One reason that the XPP and DOA formulations provide better notched Izod impact strengths than XPA formulations is believed to be related to the flexural modulus of the formulations. In general, with diluent molecules that are effective plasticizers for polymers, as the flexural modulus decreases, the notched Izod impact strength increases. As discussed above, both DOA and XPP are more effective in depressing the flexural modulus than is XPA. FIG. 9 shows the relationship between notched Izod impact strength and flexural modulus for these plasticizers formulated with CAP. With the DOA and XPP formulations, essentially a linear increase in notched Izod impact strength with decreasing flexural modulus is observed. In the case of the XPA formulations, the notched Izod impact strength does not change with flexural modulus until low values of flexural modulus are reached (high plasticizer content).

Collectively, the data provided in this example illustrates that XPP is a much more effective plasticizer for CAP than XPA. This is particularly evident at low plasticizer content which is often the desirable working range as low plasticizer formulations provide higher glass transition and heat deflection temperatures in finished parts.

Example 18

Thermal Compounding of Polylactic Acid with Glucose Pentapropionate

Mixtures of two different polylactic acids (entry 66 and entry 70) and glucose pentapropionate ($\alpha/\beta=1/1$) were prepared by shaking the components together in a plastic bag. Each mixture was compounded at 175–185° C. for 3–5 minutes in a Rheometrics Mechanical Spectrometer. The resulting resin was ground to 3 mm particle size and films were prepared by compression molding. Thermal and film properties were determined for each composition. The results are summarized in Table 10. All of the thermal properties shown in Table 10 were taken from the second heating DSC curve.

TABLE 10

Analysis of PLA plasticized with glucose pentapropionate.

| Entry | % GPP | Tm (° C.) | Tc (° C.) | Tg (° C.) | Break Stress (MPa) | Young's Modulus (MPa) | MW |
|---|---|---|---|---|---|---|---|
| 66 (comparative) | 0 | 174 | 112 | 56 | ND | ND | 168,438 |
| 67 | 10 | 169 | 108 | 46 | 49 | 2512 | |
| 68 | 12 | 166 | 105 | 40 | 46 | 2281 | |
| 69 | 17 | 168 | 101 | 45 | 48 | 2165 | |
| 70 (comparative) | 0 | 167 | — | 63 | ND | ND | 219,598 |
| 71 | 15 | 161 | 126 | 50 | ND | ND | |

Films prepared from these PLA formulations were generally clear with some opaqueness due to crystallization of the PLA. As the modulus provided in Table 10 illustrates (entries 67–69), the films became increasingly flexible with increasing GPP content. In the case of entries 67–69, each of the formulations had a depressed Tm, Tc and Tg relative to the parent PLA (entry 1) indicating good compatibility of GPP with PLA. The variability in the Tm and Tg between entries 67–69 is due to crystallization that occurred during cooling from the polymer melt in the DSC experiment. In the case of the PLA given in entry 71, crystallization was not observed during the second heating scan because all of the crystallization occurred during cooling from the first heating scan. However, after mixing with 15 wt. % GPP, no crystallization is observed during cooling from the first heating scan. Consequentially, the Tg is significantly depressed from 63° C. to 50° C. and a large crystallization exotherm is observed at 126° C. in the second heating scan. This observation is also indicative of compatibility between PLA and GPP.

Collectively, the data shown in Table 10 indicates that PLA and GPP are compatible and that GPP is an excellent choice as a plasticizer for PLA.

Example 19

Thermal Compounding of Polyvinyl Chloride with Glucose Pentapropionate

Figure 10:
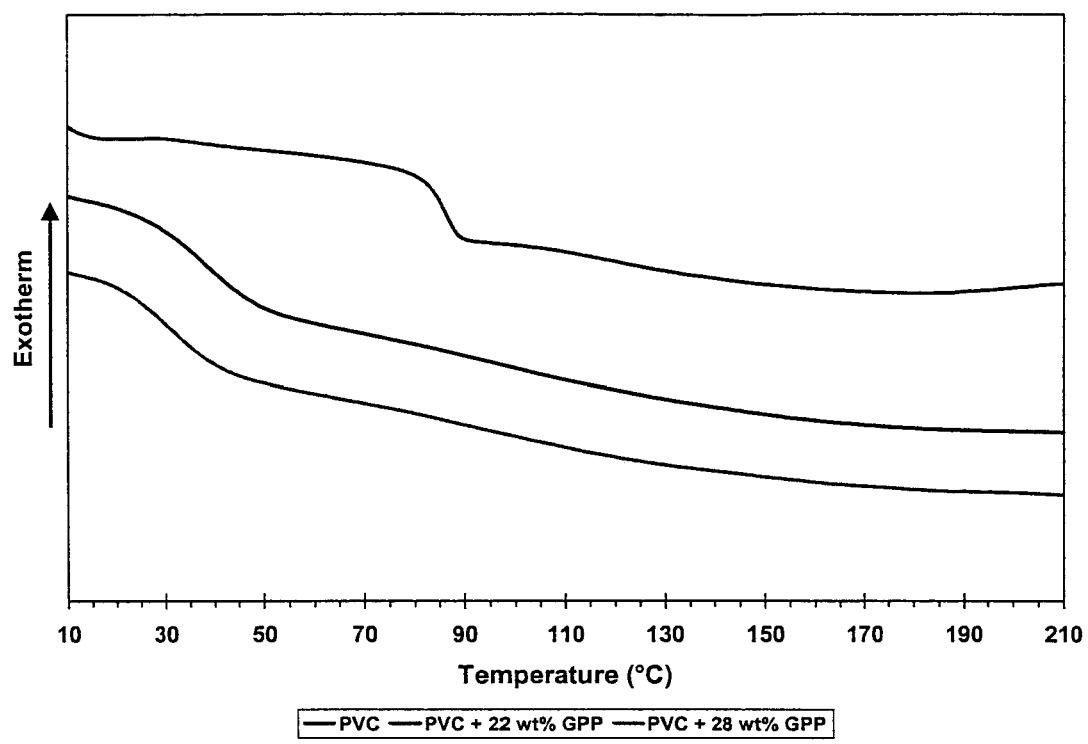
FIG. 10 provides representative 2nd scan DSC heating curves for the parent PVC and for the formulations containing GPP.

Mixtures of polyvinyl chloride and 22–36 wt. % glucose pentapropionate ($\alpha/\beta=1/1$) were prepared by shaking the components together in a plastic bag. Each mixture was compounded at 210° C. using a miniature DACA twin screw extruder. The resulting resin was ground to 3 mm particle size and the formulation was analyzed by DSC. FIG. 10 provides representative $2^{nd}$ scan DSC heating curves for the parent PVC and for the formulations containing GPP. As can be seen, the parent PVC exhibits a Tg of 85° C., which is followed by a broad melt centered at 163° C. Upon mixing with GPP, the PVC becomes completely amorphous and the Tg is significantly depressed in a composition dependent manner. This data demonstrate that GPP is highly compatible with PVC and is useful as a plasticizer for this polyolefin.

Example 20

Compounding of Cellulose Esters with Xylitol Pentaacetate and Xylitol Pentapropionate and Analysis of the Blends by Dynamic Mechanical Thermal Analysis Using the general method described in example 13, mixtures of cellulose acetate propionate ($DS_{Pr}=2.67$, $DS_{Ac}=0.06$) and cellulose acetate butyrate ($DS_{Bu}=1.72$, $DS_{Ac}=1.03$) with xylitol pentapropionate and xylitol pentaacetate were prepared at different wt % plasticizer. Uniform films were prepared from the compounded resins by compression molding using metal plates having a preformed well. The films were then analyzed by dynamic mechanical thermal analysis (DMTA) using a Rheometrics Solids Analyzer II Spectrometer operating in tension mode at a heating rate of 5° C./min and a frequency of 1 Hz.

Figure 11:
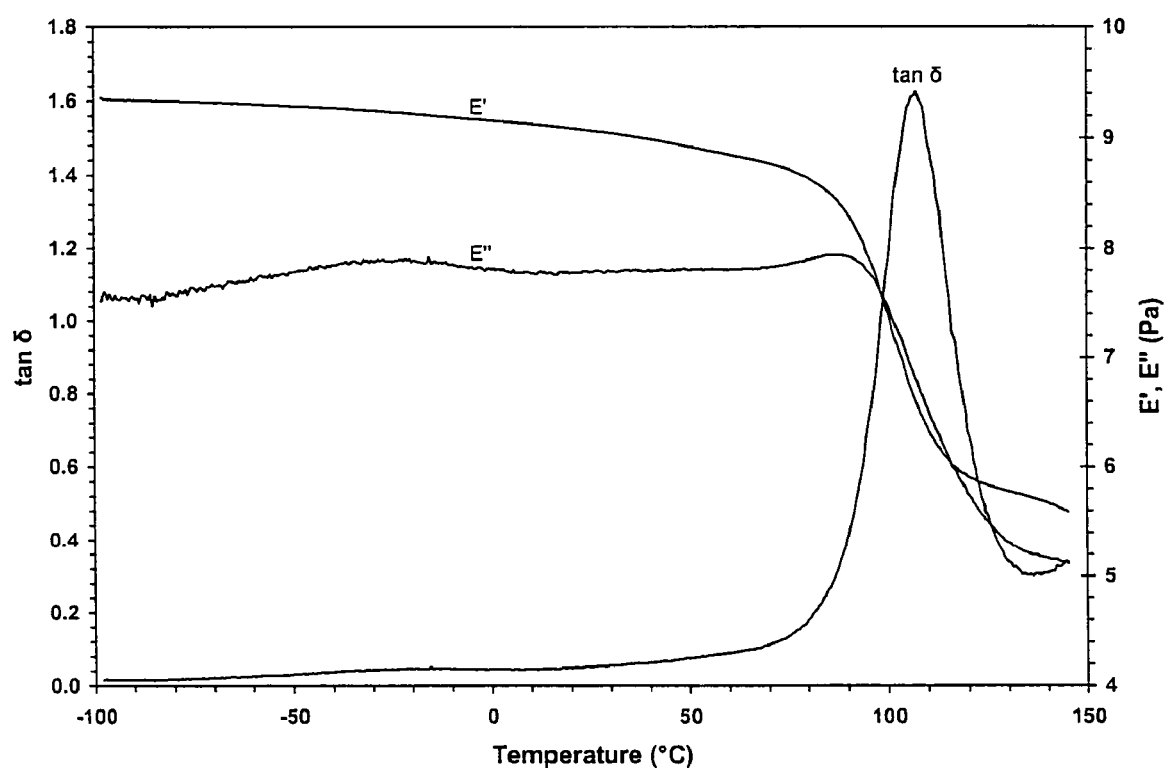
FIG. 11 is a DMTA spectrum for CAP containing 19.9 wt. % XPP.
Figure 12:
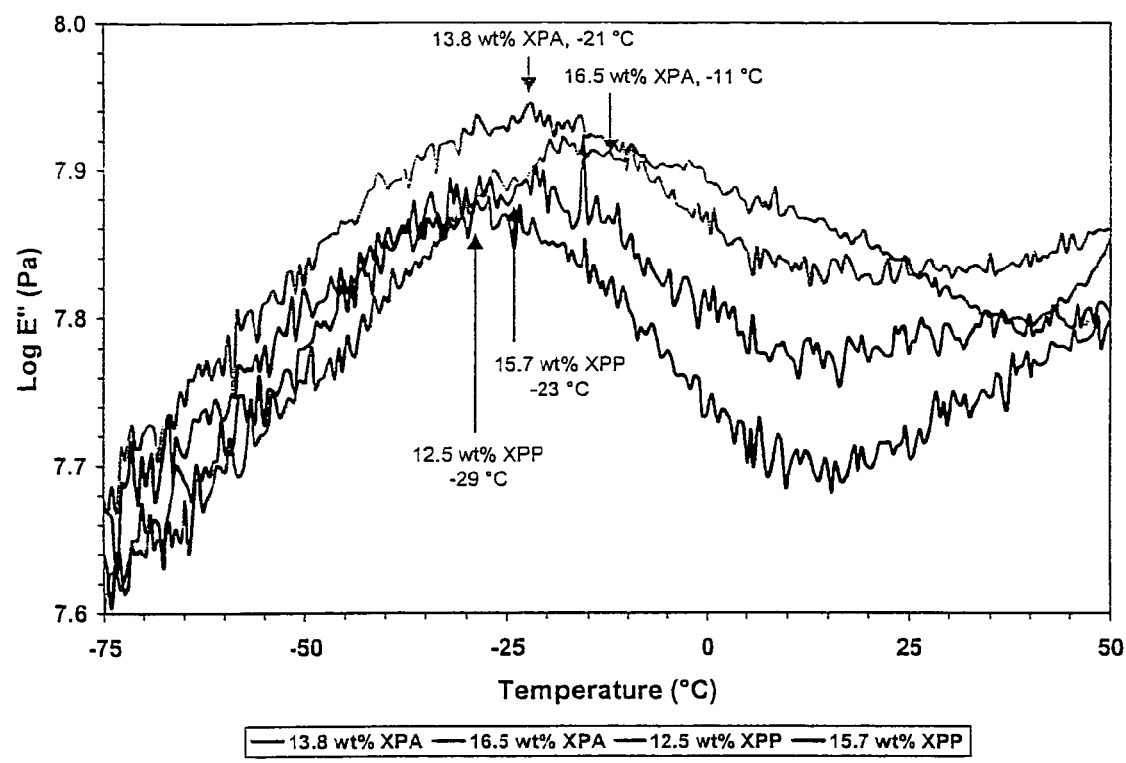
FIG. 12 illustrates the loss modulus for selected CAP-XPA, XPP blends. The arrows indicate the temperatures at which the β transitions are centered.
Figure 13:
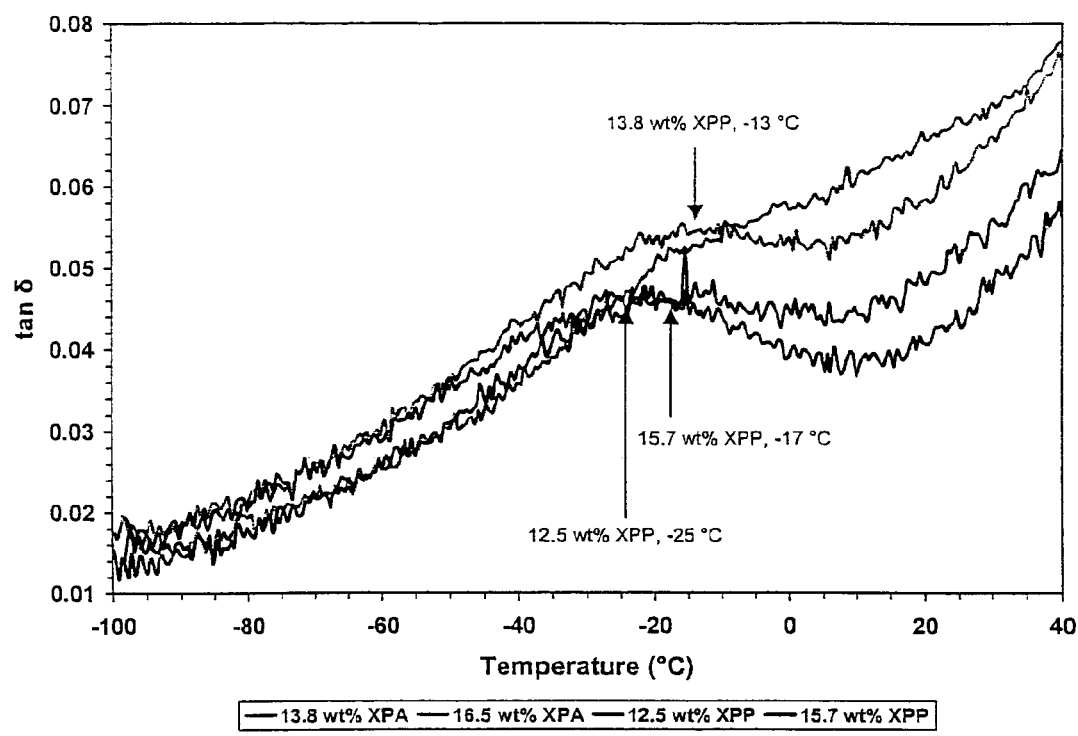
FIG. 13 illustrates the tan δ for selected CAP-XPA, XPP blends. The arrows indicate the temperatures at which the β transitions are centered. In the case of the 16.5 wt. % XPA blend, the β transition has shifted to a higher temperature and partially overlaps with the α transition.
Figure 14:
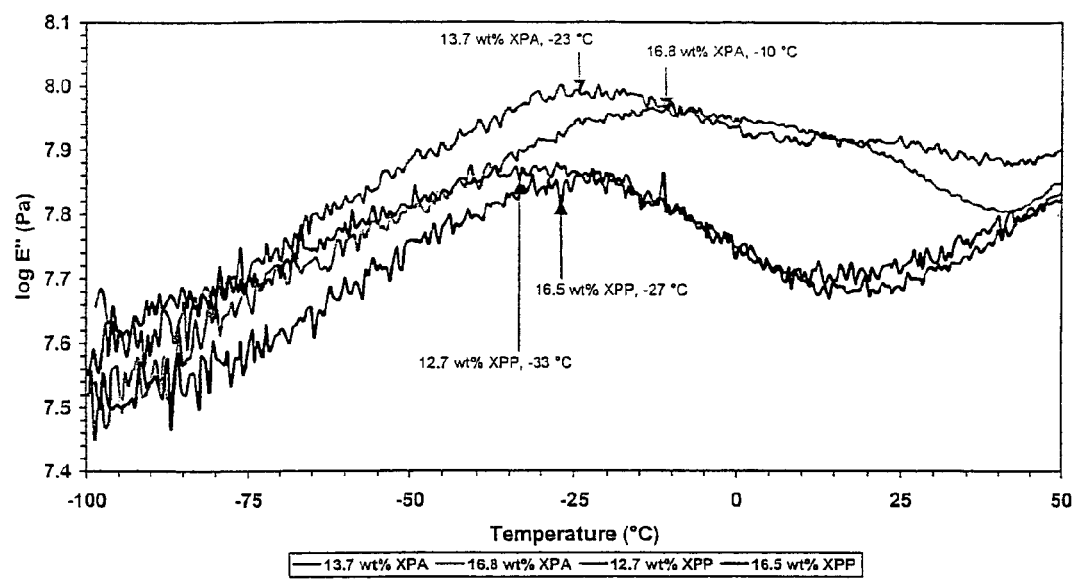
FIG. 14 illustrates the loss modulus for selected CAB-XPA, XPP blends. The arrows indicate the temperatures at which the β transitions are centered.
Figure 15:
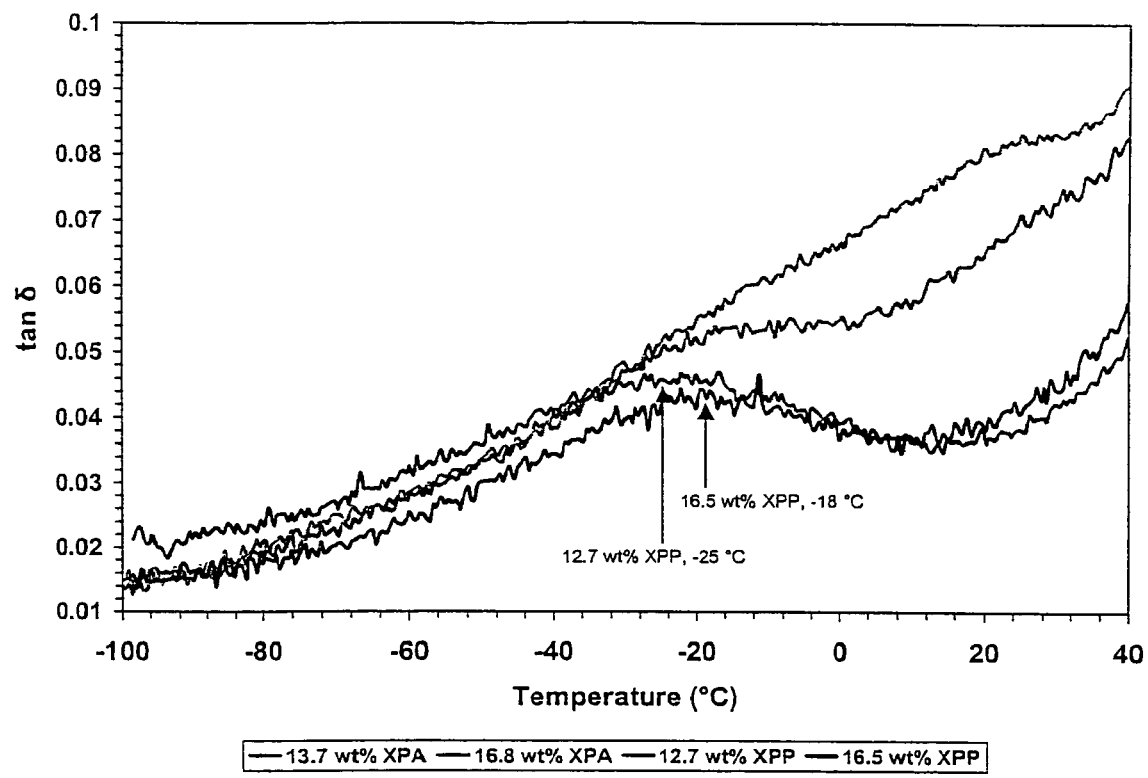
FIG. 15 illustrates the tan δ for selected CAB-XPA, XPP blends. The arrows indicate the temperatures at which the β transitions are centered. In the case of the XPA blends, the β transitions have shifted to higher temperatures and partially overlaps with the α transition.

In a DMTA experiment, a polymer or polymer blend is subjected to a series of repeated small-amplitude stains in a cyclic manner [Takayuki Murayama, "Dynamic Mechanical Analysis of Polymeric Material," Elsevier Scientific Publishing Company, NY, 1978]. Polymers perturbed in this manner store a portion of the imparted energy elastically and dissipate a portion in the form of heat. The energy stored elastically is expressed as the storage modulus, E'. The energy lost as heat is termed the loss modulus, E". The angle between the in-phase and out-of-phase components in the cyclic motion, $\delta$, is expressed as the loss tangent, tan $\delta$, where tan $\delta=E"/E'$. The DMTA spectrum for CAP containing 19.9 wt % XPP shown in FIG. 11 illustrates the measurement of these quantities. At the point at which the storage modulus E' exhibits an inflection point it can be seen that the loss modulus E" and the loss tangent tan $\delta$ exhibit a maxima. This peak corresponds to the glass transition temperature of the mixture and is due to motions of large segments of the CAP polymer. The blend shown in FIG. 11 exhibits a single Tg indicating that this is a miscible blend.

Polymers can also exhibit relaxation processes in the glassy region below the Tg. These relaxation processes are typically called β, γ, and etc transitions corresponding to the order in which they appear. The tan δ maximum corresponding to the Tg is also often termed the α transition. Numerous studies have shown that the β transition is due to rotational motion of the side chain substitutents. In order for these motions to occur, sufficient free volume must exist in the polymer matrix. Tough ductile glassy polymers and those with good impact strengths generally exhibit prominent low temperature β transitions. Cellulose esters that are not mixed with plasticizers do not exhibit a β transition. However, when mixed with a good plasticizer, cellulose esters do exhibit a β transition. The larger the β transition and the lower the temperature that it occurs, generally equates to more improved physical properties.

FIGS. 12–15 compare the β transitions typically observed in the tan δ and loss modulus curves for CAP and CAB mixed with XPA and XPP. For the sake of clarity only blends at two different levels of XPA and XPP are provided. These were selected so that the concentrations of XPA and XPP are essentially equal. As can be seen, in every case, the β transitions for the cellulose esters mixed with XPP are more pronounced and occur at a lower temperature that does the β transitions for the corresponding cellulose ester-XPA blends. As noted, a lower temperature, pronounced β transition is one of the principal factors imparting improved physical properties to a polymeric system.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope of the invention being indicated by the following claims.

What is claimed is:

1. An article prepared from a composition comprising:
   a) a plasticizer comprising one or more of:
      i) from about 5 to about 95 wt. % of a $C_2$–$C_{12}$ carbohydrate organic ester, wherein the carbohydrate comprises from about 1 to about 3 monosaccharide units; and
      ii) from about 5 to about 95 wt. % of a $C_2$–$C_{12}$ polyol ester, wherein the polyol is derived from a $C_5$ or $C_6$ carbohydrate; and
   b) from about 5 to about 95 wt. % of a $C_2$–$C_{10}$ ester of cellulose having a DS of from about 0.7 to about 3.0;
   wherein the percentages are based on the weight of component (A) plus component (B), provided, however, when a)ii) is present so as to provide a cellulose ester/polyol ester binary blend, the polyol ester does not comprise a polyol acetate or acetates.

2. The article of claim 1, wherein the article comprises a film, a fiber or a shaped object.

3. The article of claim 2, comprising the film, wherein the film is a melt extruded film suitable for coating with an adhesive, thereby providing an adhesive tape.

4. The article of claim 2, comprising the film, wherein the film is a solvent cast film suitable for use as a protective film for liquid crystal displays or as a backing for photographic or movie film.

5. The article of claim 2, comprising the film, wherein the film comprises:
   a) a cellulose ester comprising:
      i) cellulose acetate having a DS of from about 2.6 to about 2.9; or
      ii) cellulose acetate propionate having a DS of from about 2.5 to about 2.8; and
   b) from about 10 to about 35 wt. % of one or more of glucose pentaacetate, glucose pentapropionate, sorbitol hexapropionate, xylitol pentapropionate and a mixture of glucose pentapropionate and sorbitol hexapropionate or a mixture of glucose pentapropionate and xylitol pentapropionate.

6. The article of claim 2, comprising the fiber and wherein the composition comprises:
   a) cellulose acetate having a DS of from about 2.4 to about 2.6 and α-glucose pentaacetate;
   b) cellulose acetate having a DS of from about 2.4 to about 2.6 and β-glucose pentapropionate;
   c) cellulose acetate having a DS of from about 2.4 to about 2.6 and xylitol pentapropionate;
   d) cellulose acetate having a DS of from about 2.4 to about 2.6, β-glucose pentapropionate and sorbitol hexapropionate;
   e) cellulose acetate having a DS of from about 2.4 to about 2.6, β-glucose pentapropionate and xylitol pentapropionate;
   f) cellulose acetate propionate having a DS of from about 2.5 to about 2.8 and β-glucose pentapropionate;
   g) cellulose acetate propionate having a DS of from about 2.5 to about 2.8 and xylitol pentapropionate;
   h) cellulose acetate propionate having a DS of from about 2.5 to about 2.8, β-glucose pentapropionate and sorbitol hexapropionate;
   i) cellulose acetate propionate having a DS of from about 2.5 to about 2.8, β-glucose pentapropionate and xylitol pentapropionate;
   j) cellulose acetate propionate having a DS of from about 2.5 to about 2.8 and β-glucose pentabutyrate;
   k) cellulose acetate propionate having a DS of from about 2.5 to about 2.8, β-glucose pentabutyrate and sorbitol hexabutyrate;
   l) cellulose acetate propionate having a DS of from about 2.5 to about 2.8, β-glucose pentabutyrate and xylitol pentapropionate;
   m) cellulose acetate butyrate having a DS of from about 2.5 to about 2.8 and β-glucose pentapropionate;
   n) cellulose acetate butyrate having a DS of from about 2.5 to about 2.8 and xylitol pentapropionate;
   o) cellulose acetate butyrate having a DS of from about 2.5 to about 2.8 and xylitol pentabutyrate;
   p) cellulose acetate butyrate having a DS of from about 2.5 to about 2.8, β-glucose pentapropionate and sorbitol hexapropionate;
   q) cellulose acetate butyrate having a DS of from about 2.5 to about 2.8, β-glucose pentapropionate and xylitol pentapropionate;
   r) cellulose acetate butyrate having a DS of from about 2.5 to about 2.8 and β-glucose pentabutyrate;
   s) cellulose acetate butyrate having a DS of from about 2.5 to about 2.8, β-glucose pentabutyrate and sorbitol hexabutyrate; and
   t) cellulose acetate butyrate having a DS of from about 2.5 to about 2.8, β-glucose pentapropionate and xylitol pentabutyrate.

7. The article of claim 2, comprising the shaped article, wherein the shaped article has a HDT greater than about 90° C. at 66 psi.

8. The shaped article of claim 7, comprising:
a) cellulose acetate having a DS of from about 2.4 to about 2.6 and α-glucose pentaacetate;
b) cellulose acetate having a DS of from about 2.4 to about 2.6 and β-glucose pentapropionate;
c) cellulose acetate having a DS of from about 2.4 to about 2.6 and xylitol pentpropionate;
d) cellulose acetate having a DS of from about 2.4 to about 2.6, β-glucose pentapropionate and sorbitol hexapropionate;
e) cellulose acetate having a DS of from about 2.4 to about 2.6, β-glucose pentapropionate and xylitol pentapropionate;
f) cellulose acetate propionate having a DSAc of from about 1.8 to about 2.0 and a DSPr of from about 0.6 to about 0.8 and β-glucose pentapropionate;
g) cellulose acetate propionate having a DSAc of from about 1.8 to about 2.0 and a DSPr of from about 0.6 to about 0.8 and xylitol pentapropionate;
h) cellulose acetate propionate having a DSAc of from about 1.8 to about 2.0 and a DSPr of from about 0.6 to about 0.8, β-glucose pentapropionate and xylitol pentapropionate; and
i) cellulose acetate propionate having a DSAc of from about 1.8 to about 2.0 and a DSPr of from about 0.6 to about 0.8, β-glucose pentapropionate and sorbitol hexapropionate.

9. The article of claim 2, comprising the fiber, wherein the fiber comprises a composite structure of at least about 30 wt. % of a natural fiber.

10. The fiber of claim 9, comprising one or more of the following:
a) cellulose acetate having a DS of from about 2.4 to about 2.6 and α-glucose pentaacetate;
b) cellulose acetate having a DS of from about 2.4 to about 2.6 and β-glucose pentapropionate;
c) cellulose acetate having a DS of from about 2.4 to about 2.6 and xylitol pentapropionate;
d) cellulose acetate having a DS of from about 2.4 to about 2.6, β-glucose pentapropionate and sorbitol hexapropionate;
e) cellulose acetate having a DS of from about 2.4 to about 2.6, β-glucose pentapropionate and xylitol pentapropionate;
f) cellulose acetate propionate having a DS of from about 2.5 to about 2.8 and β-glucose pentapropionate;
g) cellulose acetate propionate having a DS of from about 2.5 to about 2.8 and xylitol pentapropionate;
h) cellulose acetate propionate having a DS of from about 2.5 to about 2.8, β-glucose pentapropionate and sorbitol hexapropionate;
i) cellulose acetate propionate having a DS of from about 2.5 to about 2.8, β-glucose pentapropionate and xylitol pentapropionate;
j) cellulose acetate propionate having a DS of from about 2.5 to about 2.8 and β-glucose pentabutyrate;
k) cellulose acetate propionate having a DS of from about 2.5 to about 2.8, β-glucose pentabutyrate and sorbitol hexabutyrate;
l) cellulose acetate propionate having a DS of from about 2.5 to about 2.8, β-glucose pentabutyrate and xylitol pentapropionate;
m) cellulose acetate butyrate having a DS of from about 2.5 to about 2.8 and β-glucose pentapropionate;
n) cellulose acetate butyrate having a DS of from about 2.5 to about 2.8 and xylitol pentapropionate;
o) cellulose acetate butyrate having a DS of from about 2.5 to about 2.8 and xylitol pentabutyrate;
p) cellulose acetate butyrate having a DS of from about 2.5 to about 2.8, β-glucose pentapropionate and sorbitol hexapropionate;
q) cellulose acetate butyrate having a DS of from about 2.5 to about 2.8, β-glucose pentapropionate and xylitol pentapropionate;
r) cellulose acetate butyrate having a DS of from about 2.5 to about 2.8 and β-glucose pentabutyrate;
s) cellulose acetate butyrate having a DS of from about 2.5 to about 2.8, β-glucose pentabutyrate and sorbitol hexabutyrate; and
t) cellulose acetate butyrate having a DS of from about 2.5 to about 2.8, β-glucose pentapropionate and xylitol pentabutyrate.

11. A composition comprising:
a) from about 5 to about 95 wt. % of a polymer comprising:
  i) polylactic acid; or
  ii) polyvinyl chloride; and
b) a plasticizer, wherein the plasticizer comprises one or more of:
  i) from about 5 to about 95 wt. % of a $C_2$–$C_{12}$ carbohydrate ester; or
  ii) from about 5 to about 95 wt. % of a $C_2$–$C_{12}$ polyol ester, wherein the polyol is derived from a $C_5$ or $C_6$ carbohydrate;
wherein the percentages are based on the weight of component (A) plus component (B).

12. The composition of claim 11, wherein the polymer comprises polylactic acid.

13. The composition of claim 11, wherein the polymer comprises polyvinyl chloride.

14. The composition of claim 11, wherein the plasticizer comprises both the carbohydrate ester and the polyol ester, thereby providing a ternary blend.

\* \* \* \* \*